United States Patent
Takaku et al.

(10) Patent No.: US 7,338,690 B2
(45) Date of Patent: *Mar. 4, 2008

(54) LIQUID CRYSTAL COMPOSITION AND LIQUID CRYSTAL DEVICE

(75) Inventors: Koji Takaku, Minami-ashigara (JP); Takashi Katoh, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/228,423

(22) Filed: Sep. 19, 2005

(65) Prior Publication Data

US 2006/0060822 A1    Mar. 23, 2006

(30) Foreign Application Priority Data

Sep. 17, 2004  (JP) .............................. 2004-271501
Sep. 17, 2004  (JP) .............................. 2004-271502

(51) Int. Cl.
    C09K 19/52    (2006.01)
    C09K 19/60    (2006.01)

(52) U.S. Cl. ................... 428/1.1; 428/1.3; 252/299.01; 252/299.1

(58) Field of Classification Search ................. 428/1.1, 428/1.3; 252/299.01, 299.1
    See application file for complete search history.

(56) References Cited

U.S. PATENT DOCUMENTS

| | | | |
|---|---|---|---|
| 5,006,276 A * | 4/1991 | Kaneko et al. | 252/299.1 |
| 5,621,552 A * | 4/1997 | Coates et al. | 349/86 |
| 6,486,928 B1 * | 11/2002 | Lin et al. | 349/16 |
| 6,538,714 B1 * | 3/2003 | Sahouani et al. | 349/194 |
| 6,574,044 B1 * | 6/2003 | Sahouani et al. | 359/498 |
| 7,220,466 B2 * | 5/2007 | Katoh et al. | 428/1.1 |
| 2005/0072962 A1 | 4/2005 | Takaku | |
| 2006/0054860 A1 * | 3/2006 | Katoh et al. | 252/299.1 |

FOREIGN PATENT DOCUMENTS

| EP | 103095 | * | 3/1984 |
|---|---|---|---|
| JP | 2004-117453 | * | 4/2004 |

OTHER PUBLICATIONS

English translation by computer for JP 2004-117453, http://www4.ipdl.ncipi.go.jp/Tokujitu/PAJdetail.ipdl?N0000=60&N0120=01&N2001=2&N3001=2004-117453.*
English abstrat for EP 103095 by Derwent.*
English abstract for JP 2004-117453.*
H.K. Bücher et al., "Frequency-addressed liquid crystal field effect," *Applied Physics Letters*, Aug. 15, 1974, pp. 186-188, vol. 25, No. 4.
M. Schadt, "Effects of dielectric relaxations and dual-frequency addressing on the electro-optics of guest-host liquid crystal displays," *Applied Physics Letters*, Oct. 15, 1982, pp. 697-699, vol. 41, No. 8.
K. Saitoh et al., "Development of a High-Speed and High-Resolution Liquid-Crystal Shutter (LCS) for Printer Based on Dual-Frequency Addressed G-H Mode," SID 86 Digest, pp. 262-265.
Donald L. White et al., "New adsorptive mode reflective liquid-crystal display device," *Journal of Applied Physics*, Nov. 1974, pp. 4718-4723, vol. 45, No. 11.

* cited by examiner

Primary Examiner—Shean C Wu
(74) Attorney, Agent, or Firm—Buchanan Ingersoll & Rooney PC

(57) ABSTRACT

Novel liquid crystal compositions are disclosed. One of them comprises at least a dichroic dye having a substituent containing three or more cyclic moieties, and a dual-frequency switchable nematic liquid crystal as a host liquid crystal; and another one comprises a dichroic dye having a substituent containing three or more cyclic moieties, and a liquid crystal comprising at least one nematic liquid crystal compound and at least one chiral agent. A novel liquid crystal device, comprising a pair of electrodes of which at least one is a transparent electrode and a layer between the pair of electrodes comprising one of the liquid crystal compositions, is also disclosed.

24 Claims, No Drawings

LIQUID CRYSTAL COMPOSITION AND LIQUID CRYSTAL DEVICE

CROSS-REFERENCE TO RELATED APPLICATIONS

This application claims benefit of priority under 35 USC 119 to Japanese Patent Application No. 2004-271501 filed Sep. 17, 2004, and Japanese Patent Application No. 2004-271502 filed Sep. 17, 2004.

TECHNICAL FIELD OF THE INVENTION

The present invention relates to a liquid crystal composition and a liquid crystal device comprising a liquid crystal layer comprising such liquid crystal composition, and more particularly to a liquid crystal device advantageously usable in a liquid crystal device employing a guest-host (hereinafter also referred to as GH) mode.

RELATED ART

With dissemination of digital information, importance of a display for displaying digital information (hereinafter referred to as "electronic paper") has been growing. Electronic papers are required to have a high level of visibility and a low consumption of electric power. A high level of visibility means a white background close to paper, and, for this purpose, there is preferred a manner based on a scattering white background similar to that in case of paper. Also a reflective displaying manner is advantageous from view of lower consumption of electric power, in comparison with a self-light-emitting display manner. Various manners have been proposed for the electronic paper, such as a reflective liquid crystal displaying, an electrophoretic displaying, a magnetophoretic displaying, a dichroic gyrating ball, an electrochromic displaying and a leucothermal displaying manners. However, none of these manners gives a high level of visibility as required, and an improvement has been desired.

Various types of liquid crystal device (liquid crystal display device) have already been proposed, among which a liquid crystal device employing GH mode is capable of highlight display and is expected as a reflective display. The liquid crystal device employing a GH mode usually comprises a cell filled with a liquid crystal composition, prepared by dissolving a dichroic dye in a nematic liquid crystal, and when a voltage is applied to the cell sufficient to rotate the liquid crystal molecules, the dye molecules rotate along with the liquid crystal molecules and allow changing of light absorption by the cell to thereby effect display. Such a liquid crystal device employing a GH mode, can display images without polarizing plates, is expected as a brighter display in comparison with the prior liquid crystal displays comprising polarizing plates.

A dichroic dye, to be employed in the liquid crystal device employing a GH mode, is required to have appropriate absorption characteristics and a high order parameter. Various types of dichroic dyes have been intensively investigated by various researchers, and, however, there are problems of a low solubility in a host liquid crystal and a low durability. Also a switching of the liquid crystal device is generally achieved by a change in the alignment of liquid crystal by an on/off operation of the electric field, and, however, according to such a switching manner, a response speed is sometimes slow since the alignment of liquid crystal in the absence of electric field is controlled by an alignment layer.

On the other hand, there is known "a dual-frequency switching manner". In the manner, dual-frequency liquid crystal, of which dielectric anisotropy $\Delta\epsilon$ changes from positive to negative when the frequency of the applied voltage is increasing, is utilized, and a reversible alignment change of the liquid crystal is carried out by switching frequencies of an electric field to be applied to the liquid crystal (for example cf. Applied Physics Letters, Vol. 25, No. 4, 186-188 (1974)). According to this manner, the liquid crystal molecules change their alignment actively rather than passively, and, thus, the response speed becomes faster. And such a manner has been employed in projectors. There is also known guest-host systems employing such two-frequency switchable liquid crystal (for example cf. Applied Physics Letters, Vol. 41, No. 8, 697-699 (1982); and SID '86 DIGEST, p.262-265), which is reported to have a faster response speed, and, however, suffer from low order parameters of the dual dual-frequency switchable host liquid crystal and the dye and from low contrast. It is therefore desired to provide a dichroic dye having a higher order parameter and a higher solubility, and a liquid crystal device capable of responsing with a faster speed.

On the other hand, it is known that, in a guest-host type liquid crystal device, a display contrast varies depending on an order parameter of the dichroic dye in a liquid crystal composition constituting the liquid crystal layer, a type of the host liquid crystal or a cell structure. A liquid crystal composition comprising a nematic liquid crystal and a dichroic dye, when positioned between substrates subjected to an alignment process, cannot provide a high contrast because the nematic liquid crystal molecules are aligned in a monoaxially aligned state, and such alignment state can only absorb a linear polarized light of one direction and transmits a linear polarized light of another direction. Also a liquid crystal composition comprising a nematic liquid crystal and a dichroic dye, also when positioned between substrates not subjected to an alignment process, cannot provide a high contrast because the nematic liquid crystal molecules are aligned in a multi-domain state, and such state can only absorb a linear polarized light of one direction and transmits a linear polarized light of another direction. There is proposed a phase-transition guest-host method utilizing a chiral nematic phase by a combination with a chiral agent, in order to absorb light in all the directions (D. L. White and G. N. Taylor; J. Appl. Phys., Vol. 45, 4718 (1974)). This method enables a bright display without polarizing plates.

However, such phase-transition guest-host method is associated with drawbacks of a hysteresis due to the chiral nematic phase stability, and of a low response speed. And, from the view of the order parameter, the solubility in the host liquid crystal or the durability, the dichroic dye employed therein is unsatisfactory. Despite of intensive investigations by various researchers, the display performance is still in an unsatisfactory level, and improvements have therefore been desired.

It is therefore desired to provide a liquid crystal device having a higher contrast ratio and a faster response speed.

SUMMARY OF THE INVENTION

One aspect of the present invention is to provide a liquid crystal device, employing a dual-frequency mode, having a high display contrast and a high response speed, and a liquid crystal composition useful for producing such liquid crystal device.

Another aspect of the present invention is to provide a liquid crystal device having a high display contrast and a high response speed, and a liquid crystal composition useful for producing such liquid crystal device.

A light entering to a liquid crystal cell, employing a phase-transition guest-host mode, is rotated along a spiral structure because of a refractive index anisotropy of the liquid crystal, so that it is necessary to shorten a pitch of the spiral structure in order to improve the contrast ratio. It is also necessary to increase the order parameter of the dichroic dye to be employed therein and to increase a concentration thereof in the host liquid crystal. However, a decrease in the spiral pitch or an increase in the concentration of the dichroic dye leads to a lower response speed.

The present inventors conducted various studies, and as a result, they found that, by using a dichroic dye, having a tricyclic substituent, of which structure similar to that of the host liquid crystal, an unexpected effect was obtainable which can provide a higher contrast and a faster response speed. On the basis of these findings, the present invention was achieved.

A first embodiment of the present invention relates to a liquid crystal composition comprising at least a dichroic dye having a substituent represented by a following formula (1), and a dual-frequency switchable nematic liquid crystal as a host liquid crystal:

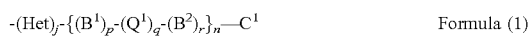  Formula (1)

where Het represents an oxygen atom or a sulfur atom; $B^1$ and $B^2$ respectively represent a substituted or non-substituted arylene group, heteroarylene group or divalent cyclic aliphatic hydrocarbon group; $Q^1$ represents a divalent linking group; $C^1$ represents a substituted or non-substituted alkyl group, cycloalkyl group, alkoxy group, alkoxycarbonyl group, acyl group or acyloxy group; j represents 0 or 1, p, q and r respectively represent an integer from 0 to 5; and n represents an integer from 1 to 3, provided that a total number of groups represented by $B^1$ and $B^2$ in the formula (1) is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p\text{-}(Q^1)_q\text{-}(B^2)_r\}$ present in two or more units may be same or different to each other; is provided.

The liquid crystal composition of the first embodiment may further comprise at least one chiral agent.

A second embodiment of the present invention relates to a liquid crystal composition comprising:

a dichroic dye having a substituent represented by a following formula (1), and a liquid crystal comprising at least one nematic liquid crystal compound and at least one chiral agent:

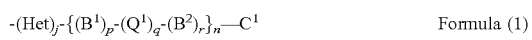  Formula (1)

where Het represents an oxygen atom or a sulfur atom; $B^1$ and $B^2$ respectively represent a substituted or non-substituted arylene group, heteroarylene group or divalent cyclic aliphatic hydrocarbon group; $Q^1$ represents a divalent linking group; $C^1$ represents a substituted or non-substituted alkyl group, cycloalkyl group, alkoxy group, alkoxycarbonyl group, acyl group or acyloxy group; j represents 0 or 1, p, q and r respectively represent an integer from 0 to 5; and n represents an integer from 1 to 3, provided that a total number of groups represented by $B^1$ and B2 in the formula (1) is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p\text{-}(Q^1)_q\text{-}(B^2)_r\}$ present in two or more units may be same or different to each other.

For the first or second embodiment, the dichroic dye may be selected from the group represented by the formula (2) or the formula (3).

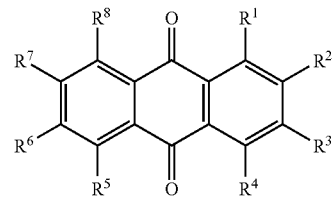

Formula (2)

In the formula, $R^1$ represents a substituent represented by $-S-\{(B^1)_p\text{-}(Q^1)_q\text{-}(B^2)_r\}_n-C^1$, in which S represents a sulfur atom, and $B^1$, $B^2$, $Q^1$, p, q, r and n have respectively same definitions as in the formula (1); and $R^2$, $R^3$, $R^4$, $R^5$, $R^6$, $R^7$ and $R^8$ respectively represent a hydrogen atom or a substituent.

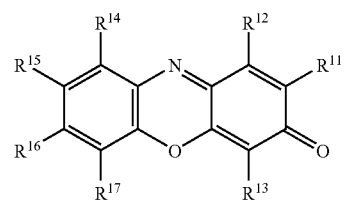

Formula (3)

In the formula (3), $R^{11}$, $R^{12}$, $R^{13}$, $R^{14}$, $R^{15}$, $R^{16}$, and $R^{17}$ respectively represent a hydrogen atom or a substituent, provided that at least one represents a substituent represented by $-S-\{(B^1)_p\text{-}(Q^1)_q\text{-}(B^2)_r\}_n-C^1$, in which S represents a sulfur atom, and $B^1$, $B^2$, $Q^1$, p, q, r and n have respectively same definitions as in the formula (1).

From another aspect, the present invention provides a liquid crystal device comprising a pair of electrodes of which at least one is a transparent electrode, and a liquid crystal layer between the pair of electrodes comprising a liquid crystal composition of the first or the second embodiment; or a liquid crystal device comprising a pair of electrodes of which at least one is a transparent electrode, and a polymer medium layer between the pair of electrodes of which at least one is a transparent electrode, comprising a polymer and a liquid crystal composition of the first or the second embodiment dispersed in the polymer; and a liquid crystal device comprising a pair of electrodes of which at least one is a transparent electrode, and a liquid crystal layer between the pair of electrodes, comprising microcapsules comprising a liquid crystal composition of the first or the second embodiment.

A liquid crystal device employing a liquid crystal composition of a first embodiment of the present invention provides a high display contrast and a high response speed.

A liquid crystal composition of a second embodiment of the present invention, comprising a dichroic dye, having a specified substituent and a liquid crystal, a nematic liquid crystal and a chiral agent, can provide a liquid crystal display device capable of showing a high contrast and a high response speed.

DETAILED DESCRIPTION OF THE INVENTION

Hereafter, the present invention will be explained in detail. In the specification, ranges indicated with "to" mean ranges including the numerical values before and after "to" as the minimum and maximum values.

LIQUID CRYSTAL COMPOSITION OF A FIRST EMBODIMENT

The liquid crystal composition of the first embodiment of the present invention comprises at least one dichroic dye having a particular substituent, and at least one dual-frequency switchable nematic liquid crystal as a host liquid crystal. In the following, there will be explained various material to be employed in the first embodiment of the present invention.

In the first embodiment of the present invention, a dichroic dye is defined as a compound capable of being dissolved in a host liquid crystal and having a function of absorbing light. According to the first embodiment, the dichroic dye is selected from compounds having a substituent represented by a formula (1) described later. Such dichroic dye not only has a large dichroic ratio (R) and a large order parameter (S), but also shows a satisfactory solubility in the nematic liquid crystal to be employed as the host liquid crystal. As a result, a liquid crystal device employing the liquid crystal composition of the first embodiment exhibits a high display contrast.

The dichroic dye used in the present invention may have any absorption maximum and an absorption band, but preferably has an absorption maximum in a yellow region (Y), a magenta region (M) or a cyan region (C). Also the dichroic dye may be employed singly or in a mixture of plural types. In case of mixing plural dyes, a mixture of dichroic dyes having an absorption maximum in Y, M or C is preferably employed. Known dichroic dyes are, for example, described by A. V. Ivashchenko, "Diachronic Dyes for Liquid Crystal Display", CRC (1994). Also a method of obtaining a full-color display by mixing a yellow dye, a magenta dye and a cyan dye is described in detail in "Color Chemistry", Sumio Tokita, Maruzen (1982). The yellow region, magenta region and cyan region mentioned above respectively mean a region of 430 to 490 nm, a region of 500 to 580 nm and a region of 600 to 700 nm.

The dichroic dye may be selected from compounds having any chromophoric group. Examples of the chromophoric group include azo dye residues, anthraquinone dye residues, perylene dye residues, merocyanine dye residues, azomethyne dye residues, phtaloperylene dye residues, indigo dye residues, azulene dye residues, dioxazine dye residues, polythiophene dye residues and phenoxazine dye residues. Among these, azo dye residues, anthraquinone dye residues and phenoxazine dye residues are preferred, and anthraquinone dye residues and phenoxazine dye, such as phenoxazine-3-one, residues are more preferred.

Examples of the azo dye include monoazo, diazo, trisazo, tetrakisazo and pentakisazo dyes. Among these, monoazo, bisazo or trisazo dyes are preferred.

The azo dye may contain any ring such as an aromatic ring (for example, benzene ring or naphthalene ring) and a hetero ring (for example, quinoline ring, pyridine ring, thiazole ring, benzothiazole ring, oxazole ring benzoxazole ring, imidazole ring, bennzoimidazole ring or pyrimidine ring).

The anthraquinone dye desirably has at least one substituent containing an oxygen atom, a sulfur atom or a nitrogen atom, such as an alkoxy group, an aryloxy group, an alkylthio group, an arylthio group, an alkylamino group or an arylamino group. The number of the substituents included in the anthraquinone dye is not limited to any range, and, in general, disubstituted, trisubstituted or tetrakissubstituted anthraquinone dyes are preferred, and disubstituted or trisubstituted anthraquinone dyes are more preferred. The substituents may bond to any position of anthraquinone rings, and, in general, 1,4-disubstituted, 1,5-disubstituted, 1,4,5-trisubstituted, 1,2,4-trisubstituted, 1,2,5-trisubstituted, 1,2,4,5-tetrasubstituted and 1,2,5,6-tetrasubstituted anthraquinone dyes are preferred.

The phenoxazine dye such as phenoxazine-3-one desirably has at least one substituent containing an oxygen atom, a sulfur atom or a nitrogen atom, such as an alkoxy group, an aryloxy group, an alkylthio group, an arylthio group, an alkylamino group or an arylamino group.

The dichroic dye, which can be used in the present invention, has at least one substituent represented by a formula (1).

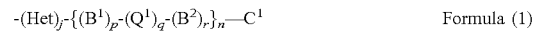

$$-(\text{Het})_j-\{(B^1)_p-(Q^1)_q-(B^2)_r\}_n-C^1 \qquad \text{Formula (1)}$$

In the formula, Het represents an oxygen atom or a sulfur atom; $B^1$ and $B^2$ respectively represent a substituted or non-substituted arylene group, heteroarylene group or divalent cyclic aliphatic hydrocarbon group; $Q^1$ represents a divalent linking group; $C^1$ represents a substituted or non-substituted alkyl group, cycloalkyl group, alkoxy group, alkoxycarbonyl group, acyl group or acyloxy group; j represents 0 or 1, p, q and r respectively represent an integer from 0 to 5; and n represents an integer from 1 to 3, provided that a total number of groups represented by $B^1$ and $B^2$ in the formula (1) is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p-(Q^1)_q-(B^2)_r\}$ present in two or more units may be same or different to each other.

Het represents an oxygen atom or a sulfur atom, and preferably a sulfur atom.

$B^1$ and $B^2$ respectively represent a substituted or non-substituted arylene group, heteroarylene group or divalent cyclic aliphatic hydrocarbon group.

The arylene group represented by $B^1$ or $B^2$ is desirably selected from $C_{6-20}$ arylene group. Preferred examples of the arylene group include divalent residues of substituted or non-substituted benzene, substituted or non-substituted naphthalene and substituted or non-substituted anthracene. Divalent residues of benzene or substituted benzene are more preferred and 1,4-phenylene is especially preferred. The heteroarylene group represented by $B^1$ or $B^2$ is desirably selected from $C_{1-20}$ heteroarylene group. Preferred examples of the heteroarylene group include divalent residues of pyridine, quinoline, isoquinoline, pyrimidine, pyrazine, thiophene, furan, oxazole, thiazole, imidazole, pyrazole, oxadiazole, thiadiazole, triazole and heteroaryl ring condensed one kind of rings or two or more kinds of rings selected therefrom. The divalent cyclic aliphatic hydrocarbon group represented by $B^1$ or $B^2$ is desirably selected from the group consisting of cyclohexane-1,2-diyl, cyclohexane-1,3-diyl, cyclohexane-1,4-diyl and cyclopentane-1,3-diyl, and is more desirably (E)-cyclohexane-1,4-diyl.

The arylene group, heteroarylene group or divalent cyclic aliphatic hydrocarbon represented by $B^1$ or $B^2$ may have a substituent, and the substituent is desirably selected from Substituent Group V shown below.

(Substituent Group V)

Halogen atom such as chlorine, bromine, iodine or fluorine; a mercapto group, a cyano group, a carboxyl group, a phosphoric acid group, a sulfonic acid group, a hydroxy group, a $C_{1-10}$, desirably $C_{2-8}$ and more desirably $C_{2-5}$ carbamoyl group such as methylcarbamoyl, ethylcarbamoyl or morpholinocarbamoyl; a $C_{0-10}$, desirably $C_{2-8}$ and more desirably $C_{2-5}$ sulfamoyl group such as methylsulfamoyl, ethylsulfamoyl or piperidinosulfamoyl; a nitro group; a $C_{1-20}$, desirably $C_{1-10}$ and more desirably $C_{1-8}$ alkoxy group such as methoxy, ethoxy, 2-methoxyethoxy or 2-phenylethoxy; a $C_{6-20}$, desirably $C_{6-12}$ and more desirably $C_{6-10}$ aryloxy group such as phenoxy, p-methylphenoxy, p-chlorophenoxy or naphthoxy; a $C_{1-20}$, desirably $C_{2-12}$ and more desirably $C_{2-8}$ acyl group such as acetyl, benzoyl or trichloroacetyl; a $C_{1-20}$, desirably $C_{2-12}$ and more desirably $C_{2-8}$ acyloxy group such as acetyloxy or benzoyloxy; a $C_{1-20}$, desirably $C_{2-12}$ and more desirably $C_{2-8}$ acylamino group such as acetylamino; a $C_{1-20}$, desirably $C_{1-10}$ and more desirably $C_{1-8}$ sulfonyl group such as methanesulfonyl, ethanesulfonyl or benzenesulfonyl; a $C_{1-20}$, desirably $C_{1-10}$ and more desirably $C_{1-8}$ sulfinyl group such as methanesulfinyl, ethanesulfinyl or benzenesulfinyl; a $C_{1-20}$, desirably $C_{1-12}$ and more desirably $C_{1-8}$ substituted or non-substituted amino group such as non-substituted amino, methylamino, dimethylamino, benzylamino, anilino, diphenylamino, 4-methylphenylamino, 4-ethylphenylamino, 3-n-propylphenylamino, 4-n-propyl phenylamino, 3-n-butylphenylamino, 4-n-butylphenylamino, 3-n-pentylpehnylamino, 4-n-pentylphenylamino, 3-trifluoro methylphenylamino, 4-trifluoromethylphenylamino, 2-pyridylamino, 3-pyridylamino, 2-thiazolylamino, 2-oxazolylamino, N,N-methylphenylamino, N,N-ethyl phenylamino; a $C_{0-15}$, desirably $C_{1-10}$ and more desirably $C_{3-6}$ ammonium group such as trimethylammonium or triethylammonium; a $C_{0-15}$, desirably $C_{1-10}$ and more desirably $C_{1-6}$ hydrazino group such as trimethylhydrazino; a $C_{1-15}$, desirably $C_{1-10}$ and more desirably $C_{1-6}$ ureido group such as non-substituted ureido or N,N-dimethylureido; a $C_{1-15}$, desirably $C_{1-10}$ and more desirably $C_{1-6}$ imido group such as succinimido; a $C_{1-20}$, desirably $C_{1-12}$ and more desirably $C_{1-8}$ alkylthio group such as methylthio, ethylthio or propylthio; a $C_{6-80}$, desirably $C_{6-40}$ and more desirably $C_{6-30}$ arylthio group such as phenylthio, p-methylphenylthio, p-chlorophenylthio, 2-pyridylthio, 1-naphthylthio, 2-naphthylthio, 4-propylcyclohexyl-4'-diphenylthio, 4-butylcyclohexyl-4'-diphenylthio, 4-pentylcyclohexyl-4'-diphenylthio, or 4-propylphenyl-2-ethynyl-4'-diphenylthio; a $C_{1-80}$, desirably $C_{1-40}$ and more desirably $C_{1-30}$ heteroarylthio group such as 2-pyridylthio, 3-pyridylthio, 4-pyridylthio, 2-quinolylthio, 2-frylthio, 2-pyrrolylthio; a $C_{2-20}$, desirably $C_{2-12}$ and more desirably $C_{2-8}$ alkoxycarbonyl group such as methoxycarbonyl, ethoxycarbonyl or 2-benzyloxycarbonyl; a $C_{6-20}$, desirably $C_{6-12}$ and more desirably $C_{6-10}$ aryloxycarbonyl group such as phenoxycarbonyl; a $C_{1-18}$, desirably $C_{1-10}$ and more desirably $C_{1-15}$ non-substituted alkyl group such as methyl, ethyl, propyl or butyl; a $C_{1-18}$, desirably $C_{1-10}$ and more desirably $C_{1-5}$ substituted alkyl group such as hydroxylmethyl, trifluoromethyl, benzyl, carboxyethyl, ethoxycarbonylethyl or acethylamino methyl, of which examples also include a $C_{2-18}$ (desirably $C_{3-10}$ and more desirably $C_{3-5}$) unsaturated hydrocarbon group such as vinyl, ethynyl, 1-cyclohexenel, benzylidine or benzylidene; a $C_{6-20}$, desirably $C_{6-15}$ and more desirably $C_{6-10}$ substituted or non-substituted aryl group such as phenyl, naphthyl, p-carboxyphenyl, p-nitrophenyl 3,5-dichlorophenyl, p-cyanophenyl, m-fluorophenyl, p-tolyl, 4-propylcyclohexyl-4'-diphenyl, 4-butylcyclohexyl-4'-diphenyl, 4-pentylcyclohexyl-4'-diphenyl or 4-propylphenyl-2-ethyl-4'-diphenyl; and a $C_{1-20}$, desirably $C_{2-10}$ and more desirably $C_{4-6}$ substituted or non-substituted heteroaryl group such as pyridyl, 5-methylpyridyl, thienyl, furyl, morpholino or tetrahydrofurfuryl.

The rings such as benzene or naphthalene ring included in the substituents exemplified above may be condensed with other rings. Examples of the substituent also include groups substituted with the substituent selected from Substituent Group V.

Among these, as a substituent of $B^1$ or $B^2$, the exemplified alkyl group, aryl group, alkoxy group, aryloxy group, halogen atom, non-substituted amino, substituted amino group, hydroxy, alkylthio group and arylthio group are preferred, and the exemplified alkyl group, aryl group or halogen atom are more preferred.

$Q^1$ is a divalent linking group. $Q^1$ may consist of at least one atom selected from carbon atom, nitrogen atom, oxygen atom or sulfur atom. Examples of the divalent linking group include $C_{0-60}$ divalent linking groups consisting of one or a combination of two or more selected from a $C_{1-20}$ alkylene group such as methylene, ethylene, propylene, butylene, pentylene or cyclohexyl-1,4-diyl, a $C_{2-20}$ alkenylene group such as ethenylene, a $C_{2-20}$ alkynylene such as ethynylene, an amido group (—NH—), an ether group (—O—), an ester group (—COO—), a sulfonamide group (—SO$_2$NH—), a sulfonate group (—SO$_3$—), a ureido group (—NH—CO—N—), a sulfonyl group (—SO$_2$—), a sulfinyl group (—SO—), a thioether group (-s-), a carbonyl group (—CO—), —NR— (where R is a hydrogen atom, an alkyl group or an aryl group), an azo group (13 N$_2$—), an azoxy group (—N$_2$(O)—) and a divalent heterocyclic group such as piperazine-1,4-diyl. $Q^1$ is desirably an alkylene group, an alkenylene group, an alkynylene group, an ether group, a thioether group, an amido group, an ester group, a carbonyl group or a combination thereof. $Q^1$ may carry a substituent selected from the substituent group V described above.

$C^1$ represents an optionally substituted alkyl group, an optionally substituted cycloalkyl group, an optionally substituted alkoxy group, an optionally substituted alkoxycarbonyl group, an optionally substituted acyl group or an optionally substituted acyloxy group. Preferred examples of $C^1$ include a $C_{1-30}$, desirably $C_{1-12}$ and more desirably $C_{1-8}$ alkyl and cycloalkyl group such as methyl, ethyl, propyl, i-propyl, butyl, i-butyl, s-butyl, t-butyl, pentyl, t-pentyl, hexyl, heptyl, octyl, cyclohexyl, 4-methylcyclohexyl, 4-ethylcyclohexyl, 4-propylcyclohexyl, 4-butylcyclohexyl, 4-pentylcyclohexyl, hydroxymethyl, trifluoromethyl or benzyl; a $C_{1-20}$, desirably $C_{1-10}$ and more desirably $C_{1-8}$ alkoxy group such as methoxy, ethoxy, 2-methoxyethoxy or 2-phenylethoxy; a $C_{1-20}$, desirably $C_{2-12}$ and more desirably $C_{2-8}$ acyloxy group such as acetyloxy or benzoyloxy; a $C_{1-30}$, desirably $C_{1-12}$ and more desirably $C_{1-8}$ acyl group such as formyl, acetyl pivaloyl, 2-chloroacetyl, stearoyl, benzoyl or p-n-octyloxyphenylcarbonyl; and a $C_{2-20}$, desirably $C_{2-12}$ and more desirably $C_{2-8}$ alkoxycarbonyl group such as methoxycarbonyl, ethoxycarbonyl or 2-benzyloxycarbonyl. $C^1$ is desirably selected from a substituted or non-substituted alkyl group, a substituted or non-substituted cycloalkyl group or a substituted or non-substituted alkoxy group, and more desirably selected from ethyl, propyl, butyl, pentyl, hexyl, or trifluoromethoxy. $C^1$ may carry a substituent selected from the substituent group V described above.

In the formula, j is 0 or 1, and preferably 0.

In the formula, p, q and r respectively represents an integer from 0 to 5 and n is an integer from 1 to 3, satisfying $3 \leq (p+r) \times n \leq 10$. Or in other words, the total numbers of $B^1$ and $B^2$ included in the formula is 3 to 10 (thinking about the case that n is 2 or more and p and r are different to each other, for example, thinking about the case of n=2, there are two p, one of them being $p^1$ and another being $p^2$, and two r, one of them being $r^1$ and another being $r^2$, the value of ($p^1+r^1+p^2+r^2$) should fall within the range from 3 to 10.

Preferred combinations of p, q and r are (i) to (ix) as shown below:

(i) P=3, q=0, r=0 and n=1;
(ii) P=4, q=0, r=0 and n=1;
(iii) P=5, q=0, r=0 and n=1;
(iv) P=2, q=0, r=1 and n=1;
(v) P=2, q=1, r=1 and n=1;
(vi) P=1, q=1, r=2 and n=1;
(vii) P=3, q=1, r=1 and n=1;
(viii) P=2, q=0, r=2 and n=1;
(ix) P=1, q=1, r=1 and n=2;
(x) P=2, q=1, r=1 and n=2;

Especially preferred combinations are (i) P=3, q=0, r=0 and n=1; (iv) P=2, q=0, r=1 and n=1; and (v) P=2, q=1, r=1 and n=1.

The substituent represented by the formula of —{$(B^1)_p$-$(Q^1)_q$-$(B^2)_r$}$_n$—$C^1$ preferably containing structures exhibiting liquid crystallinity. The structures may exhibit any kind of liquid crystallinity, however, preferably nematic, smectic, or discotic liquid crystallinity, more preferably nematic liquid crystallinity.

Specific examples of liquid crystal compounds include, but not to be limited to, those described in the third chapter "Molecular structure and liquid crystallinity" of "Liquid Crystal Handbook" edited by Liquid crystal handbook editing committee, published by Maruzen in 2000.

Specific examples of the substituent represented by the formula of —{$(B^1)_p$-$(Q^1)_q$-$(B^2)_r$}$_n$—$C^1$ will be listed below, which by no means restricts the present invention. In the following formulae, wave lines denote portions of bonding to Het.

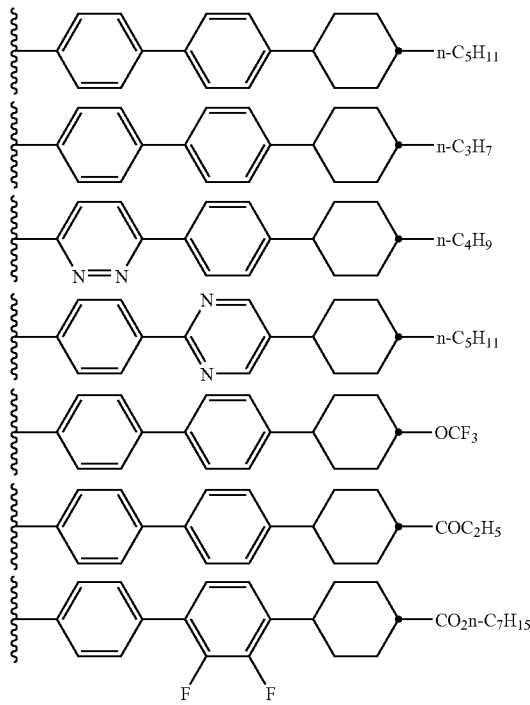

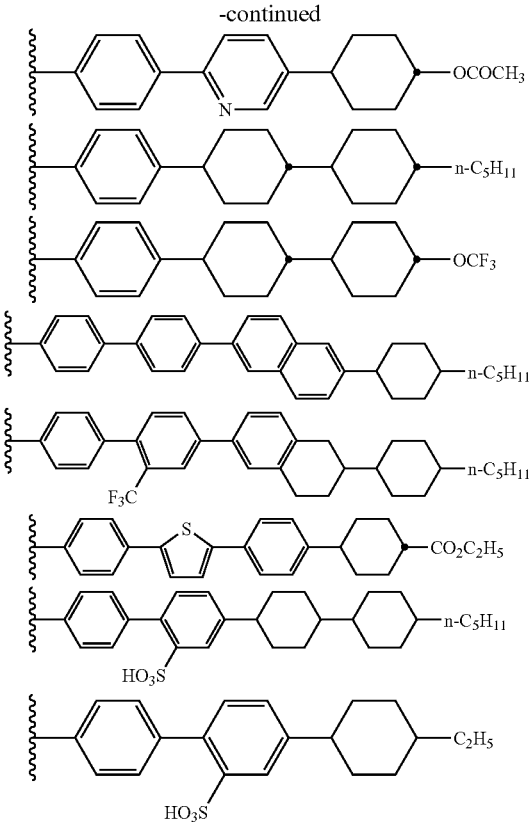

The dichroic dye to be used in the present invention desirably has at least one, more desirably 1 to 8, much more desirably 1 to 4 and further much more desirably 1 or 2 substituents represented by the formula (1), "-(Het)$^j$-{$(B^1)_p$-$(Q^1)_q$-$(B^2)_r$}$_n$—$C^1$".

One of preferred examples of the substituent represented by the formula (1) is a substituent represented by the formula in which Het is a sulfur atom, $B^1$ is a substituted or non-substituted arylene or heteroarylene group, $B^2$ is a cyclohexane-1,4-diyl group, $C^1$ is a substituted or non-substituted alkyl group, j=1, p=2, q=0, r=1 and n=1; and another preferred example of the substituent is a substituent represented by the formula in which Het is a sulfur atom, $B^1$ is a substituted or non-substituted arylene or heteroarylene group, $B^2$ is a cyclohexane-1,4-diyl group, $C^1$ is a substituted or non-substituted alkyl group, j=1, p=1, q=0, r=2 and n=1. One of especially preferred examples of the substituent is a substituent represented by a formula (a-1) shown below, or, in other words, a substituent represented by the formula in which Het is a sulfur atom, $B^1$ is a substituted or non-substituted 1,4-phenylen group, $B^2$ is a trans-cyclohexyl group, $C^1$ is a substituted or non-substituted alkyl group (preferably methyl, ethyl, propyl, butyl, pentyl or hexyl), j=1, p=2, q=0, r=1 and n=1; and another especially preferred example of the substituent is a substituent represented by a formula (a-2), or, in other words, a substituent represented by the formula in which Het is a sulfur atom, $B^1$ is a substituted or non-substituted 1,4-phenylene group, $B^2$ is a trans-cyclohexane-1,4-diyl group, $C^1$ is a substituted or non-substituted alkyl group (preferably methyl, ethyl, propyl, butyl, pentyl or hexyl), j=1, p=1, q=0, r=2 and n=1.

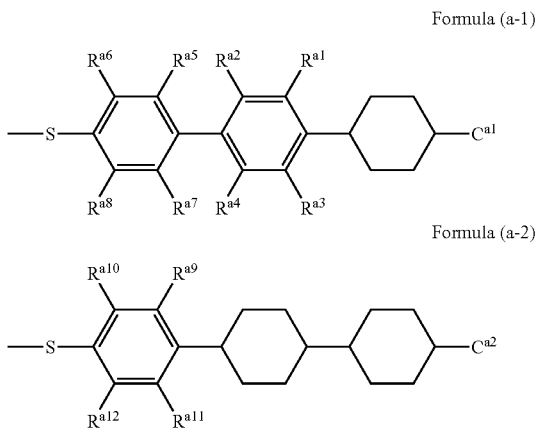

Formula (a-1)

Formula (a-2)

In the formulae, $R^{a1}$ to $R^{a12}$ respectively represent a hydrogen atom or a substituent. The substituent is selected from Substituent Group V described above. It is preferred that $R^{a1}$ to $R^{a12}$ respectively represent a hydrogen atom, a halogen atom (preferably fluorine atom), a substituted or non-substituted alkyl group, a substituted or non-substituted aryl group or a substituted or non-substituted alkoxy group.

In the formulae, $C^{a1}$ and $C^{a2}$ respectively represent a substituted or non-substituted alkyl group, and preferably methyl, ethyl, propyl, butyl, pentyl or hexyl.

The dichroic dye which can be used in the present invention desirably selected from the group represented by a formula (2) or a formula (3) shown below.

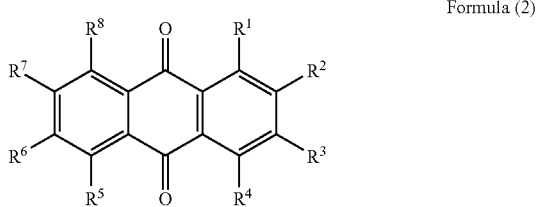

Formula (2)

In the formula, $R^1$ represents a substituent represented by $-S-\{(B^1)_p-(Q^1)_q-(B^2)_r\}_n-C^1$, in which S represents a sulfur atom, and $B^1$, $B^2$, $Q^1$, p, q, r and n have same definitions and same preferred ranges as in the formula (1). $R^2$, $R^3$, $R^4$, $R^5$, $R^6$, $R^7$ and $R^8$ respectively represent a hydrogen atom or a substituent.

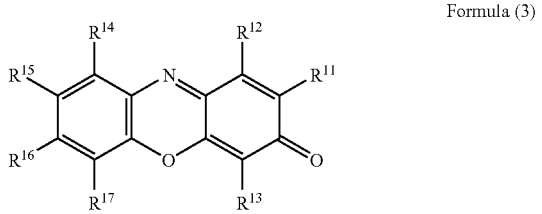

Formula (3)

In the formula, $R^{11}$, $R^{12}$, $R^{13}$, $R^{14}$, $R^{15}$, $R^{16}$, and $R^{17}$ each respectively represents a hydrogen atom or a substituent, but at least one (preferably $R^{14}$) represents a substituent represented by $-S-\{(B^1)_p-(Q^1)_q-(B^2)_r\}_n-C^1$, wherein S represents a sulfur atom, and $B^1$, $B^2$, $Q^1$, p, q, r and n have same definitions and have same preferable ranges as in the formula (1).

A substituent represented by $R^2$, $R^3$, $R^4$, $R^5$, $R^6$, $R^7$ or $R^8$ can be the aforementioned substituent group V, and preferred examples of the substituent include a substituted or non-substituted $C_{6-80}$, desirably $C_{6-40}$ and more desirably $C_{6-30}$ arylthio group such as phenylthio, p-methylphenylthio, p-chlorophenylthio, 4-methylphenylthio, 4-ethylphenylthio, 4-n-propylphenylthio, 2-n-butylphenylthio, 3-n-butylphenylthio, 4-n-butylphenylthio, 2-t-butylphenylthio, 3-t-butylphenylthio, 4-t-butylphenylthio, 3-n-pentylphenylthio, 4-n-pentylphenylthio, 4-amylpentylphenylthio, 4-hexylphenylthio, 4-heptylphenylthio, 4-octylphenylthio, 4-trifluoromethylphenylthio, 3-trifluoromethylphenylthio, 2-pyridylthio, 1-naphthylthio, 2-naphthylthio, 4-propylcyclohexyl-4'-biphenylthio, 4-butylcyclohexyl-4'-biphenylthio, 4-pentylcyclohexyl-4'-biphenylthio, or 4-propylphenyl-2-ethynyl-4'-biphenylthio); a substituted or non-substituted $C_{1-80}$, more desirably $C_{1-40}$ and much more desirably $C_{1-30}$ heteroarylthio group such as 2-pyridylthio, 3-pyridylthio, 4-pyridylthio, 2-quinolylthio, 2-furylthio or 2-pyrrolylthio; a substituted or non-substituted alkylthio group such as methylthio, ethylthio, butylthio or phenethylthio; a substituted or non-substituted amino group such as non-substituted amino, methylamino, dimethylamino, benzylamino, anilino, diphenylamino, 4-methylphenylamino, 4-ethylphenylamino, 3-n-propylphenylamino, 4-n-propylphenylamino, 3-n-butylphenylamino, 4-n-butylphenylamino, 3-n-pentylphenylamino, 4-n-pentylphenylamino, 3-trifluoromethylphenylamino, 4-trifluoromethylphenylamino, 2-pyridylamino, 3-pyridylamino, 2-thiazolylamino, 2-oxazolylamino, N,N-methylphenylamino or N,N-ethylphenylamino; a halogen atom such as a fluorine atom or a chlorine atom; a substituted or non-substituted alkyl group such as methyl, or trifluoromethyl; a substituted or non-substituted alkoxy group such as methoxy, or trifluoromethoxy; a substituted or non-substituted aryl group such as phenyl; a substituted or non-substituted heteroaryl group such as 2-pyridyl; a substituted or non-substituted aryloxy group such as phenoxy; and a substituted or non-substituted heteroaryloxy group such as 3-thienyloxy.

$R^2$, $R^3$, $R^4$, $R^5$, $R^6$, $R^7$ and $R^8$ each is preferably a hydrogen atom, a fluorine atom, a chlorine atom or a hydroxy, or an arylthio group, an alkylthio group, an amino group, an alkylamino group, an arylamino group, an alkyl group, an aryl group, an alkoxy group or an aryloxy group each of which can be substituted or non-substituted. $R^2$, $R^3$, $R^4$, $R^5$, $R^6$, $R^7$ and $R^8$ each is more preferably a hydrogen atom, a fluorine atom or a hydroxy, or an arylthio group, an alkylthio group, an amino group, an alkylamino group or an arylamino group each of which can be substituted or non-substituted.

A substituent represented by $R^{11}$, $R^{12}$, $R^{13}$, $R^{14}$, $R^{15}$ or $R^{17}$ is preferably a halogen atom or a hydroxy, or an alkyl group, an aryl group, an alkylthio group, an arylthio group, a heterocyclic thio group, an alkoxy group, an aryloxy group, a carbamoyl group, an acyl group, an aryloxycarbonyl group, an alkoxycarbonyl group or an amide group each of which can be substituted or non-substituted. $R^{11}$, $R^{12}$, $R^{13}$, $R^{14}$, $R^{15}$, or $R^{17}$ is more preferably a hydrogen atom or a halogen atom, or an alkyl group, an arylthio group or an amide group each of which can be substituted or non-substituted.

$R^{16}$ is preferably a substituted or non-substituted amino group (including alkylamino or arylamino), a hydroxy, a mercapto group, a substituted or non-substituted alkylthio group, a substituted or non-substituted arylthio group, a substituted or non-substituted alkoxy group or a substituted or non-substituted aryloxy group, and particularly preferably a substituted or non-substituted amino group.
Examples of the dichroic dye, which can be used in the present invention, include, however not to be limited to, the compounds shown below.
No. 1-1
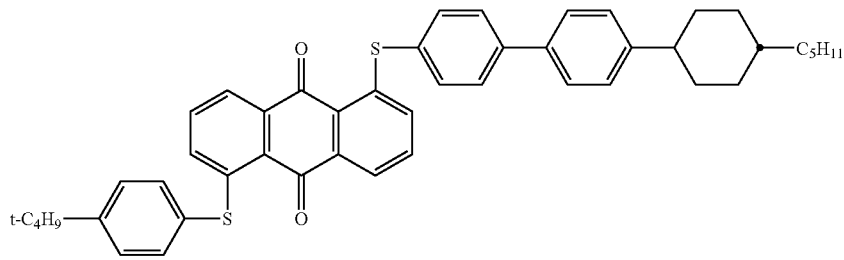
No. 1-2
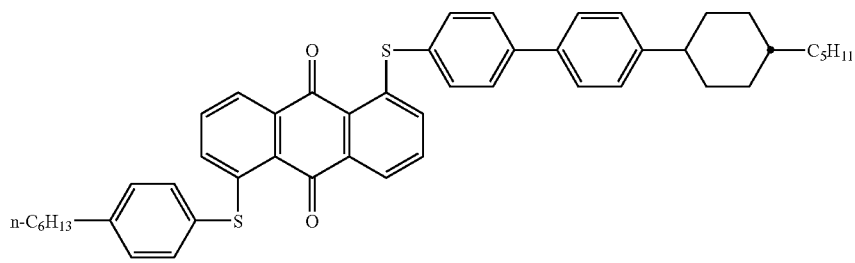
No. 1-3
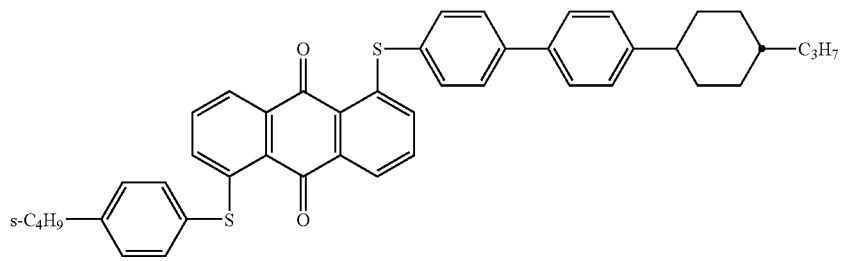
No. 1-4
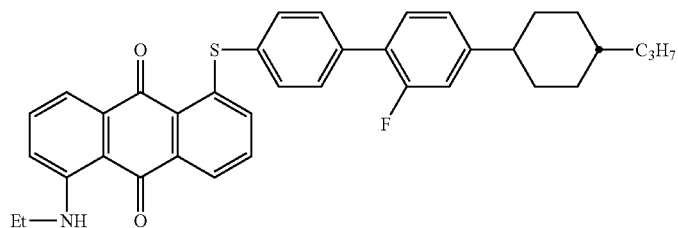
No. 1-5
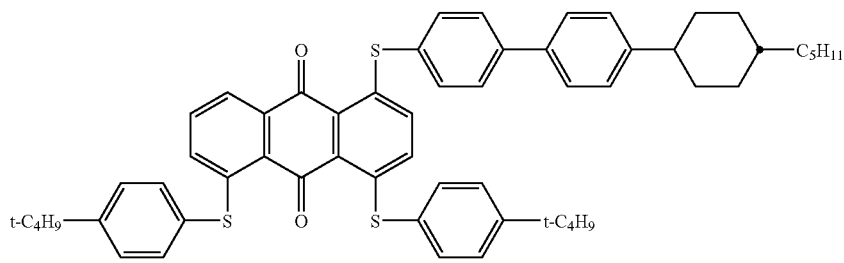

-continued
No. 1-6
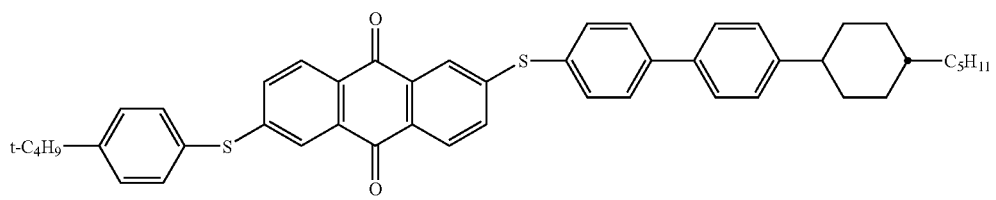
No. 1-7
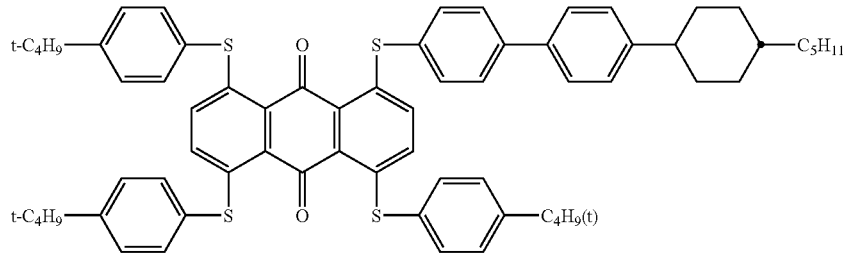
No. 1-8
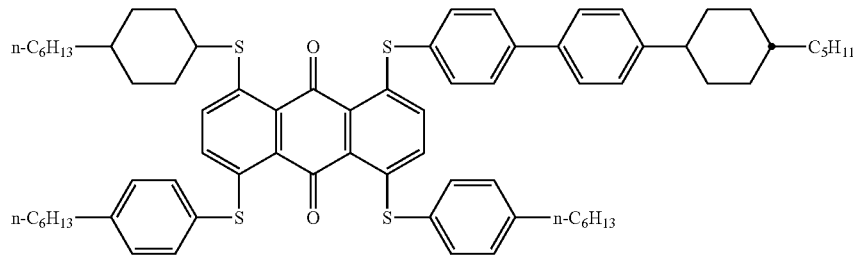
No. 1-9
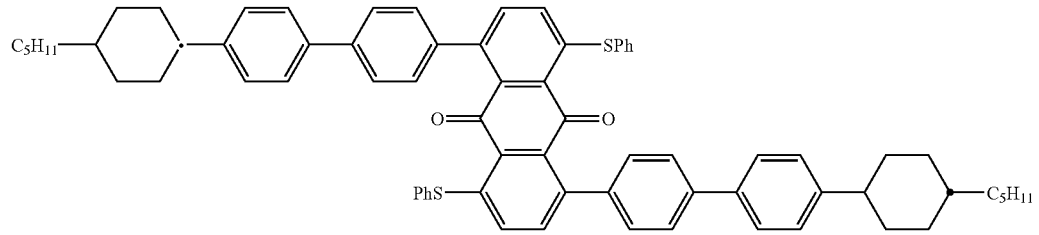
No. 1-10
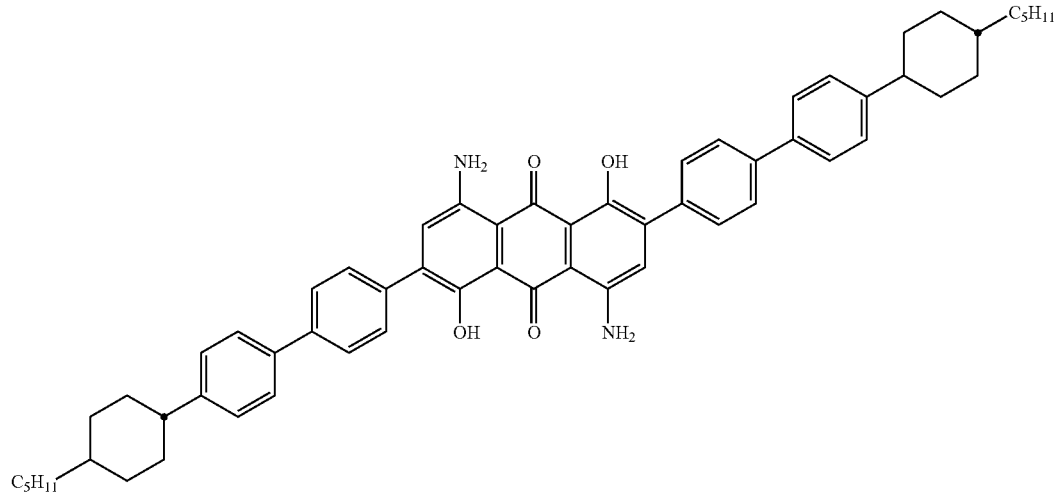

-continued
No. 1-11
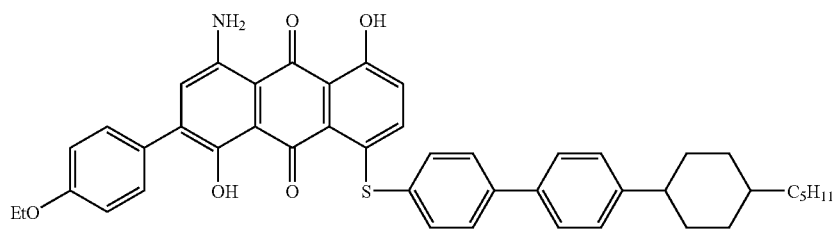
No. 1-12
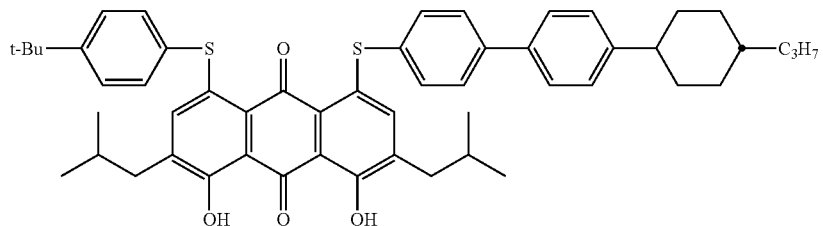
No. 1-13
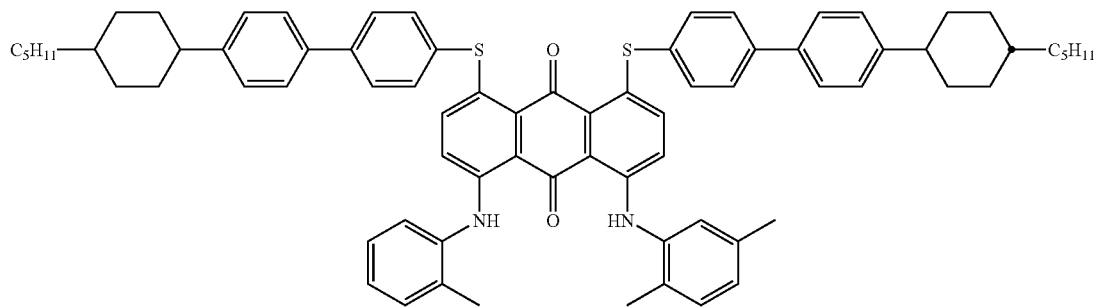
No. 1-14
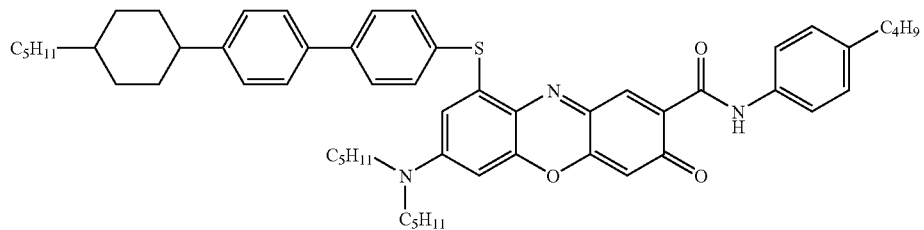
No. 1-15
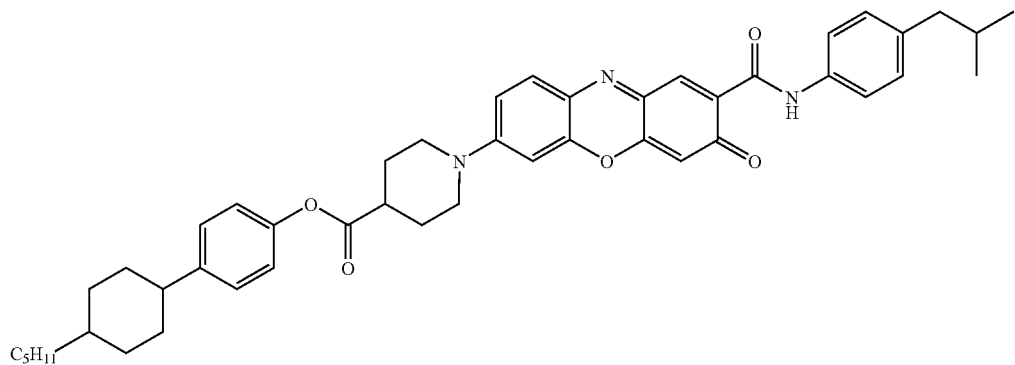

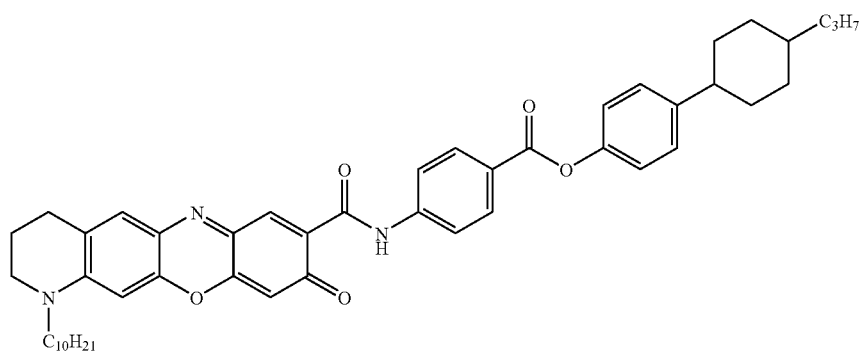
No. 1-16
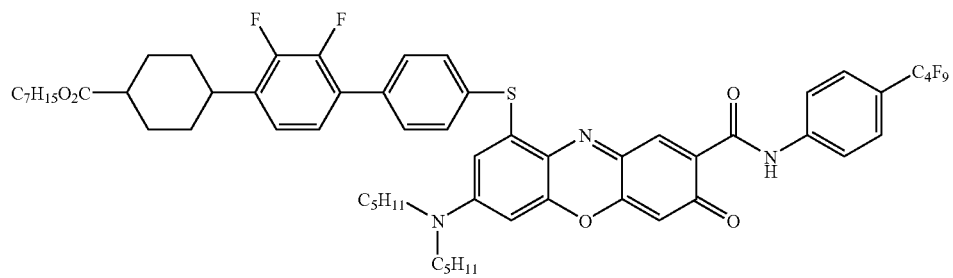
No. 1-17
Examples of the dichroic azo dye, which can be used in the present invention, include, however not to be limited to, the compounds shown below.
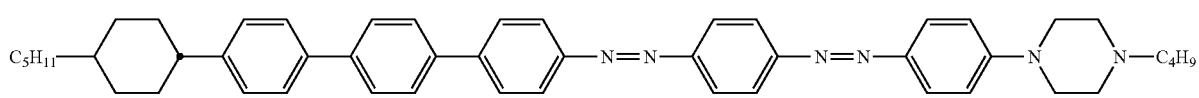
No. 2-1
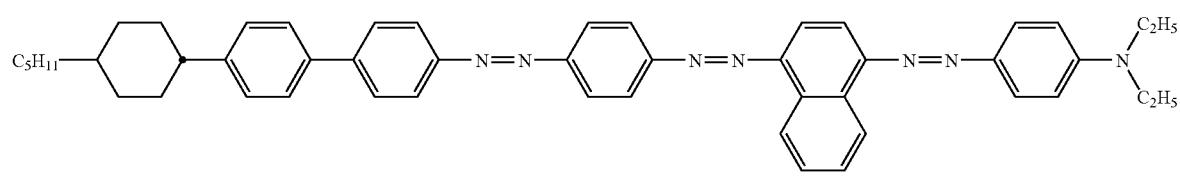
No. 2-2
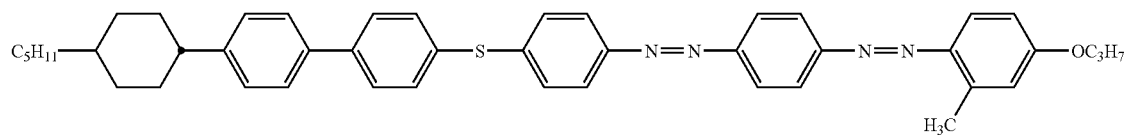
No. 2-3

Examples of the dichroic dioxazine dye, which can be used in the present invention, include, however not to be limited to, the compounds shown below.

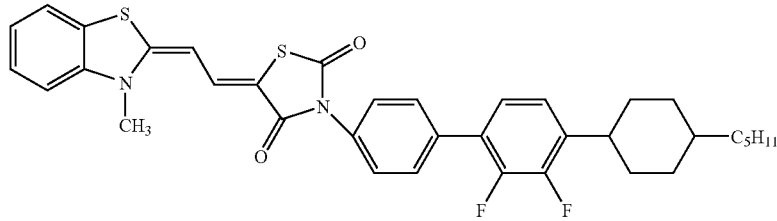

No. 3-1

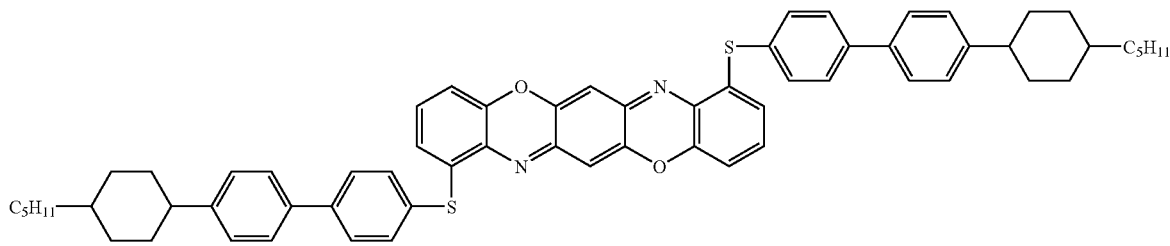

No. 3-2

In the following there will be explained a host liquid crystal to be employed in the first embodiment of the invention. The host liquid crystal is preferably a compound capable of changing in an alignment state thereof when being applied with an electric field, thereby controlling an alignment state of a dichroic dye dissolved as a guest. According to the first embodiment, as a host liquid crystal, at least one dual-frequency switchable nematic liquid crystal is used. The "dual-frequency switchable liquid crystal" means a liquid crystal exhibiting a positive dielectric anisotropy while being in an electric field of a low frequency range and exhibiting an inversion to a negative dielectric anisotropy while being in an electric field of a high frequency range, as detailedly described in *Liquid Crystal Device Handbook*, Japan Society for the Promotion of Science, Committee 142, p. 189-192 (1989), published by Nikkan Kogyo Shimbun). In the first embodiment, any dual-frequency switchable smectic liquid crystal can be used. Specific examples of such liquid crystal include those shown in the following, manufactured by Eastman Kodak Co.

(1:1 mixture)

Also commercially available dual-frequency switchable liquid crystals include DF-02XX, DF-05XX, FX-1001 and FX-1002 manufactured by Chisso Co., and MLC-2048 manufactured by E. Merck Inc.

The composition of the first embodiment may also comprise a nematic liquid crystal that does not show an inversion of the sign of the dielectric anisotropy between a low frequency region and a high frequency region of the applied electric field. However, even in case of comprising such nematic liquid crystal, the composition has a cross-over frequency in order to enable a dual-frequency switching. Specific examples of the nematic liquid crystal compound to be used in combination include an azomethine compound, a cyanobiphenyl compound, a cyanophenyl ester, a fluorine-substituted phenyl ester, a cyclohexanecarboxylate phenyl ester, a fluorine-substituted cyclohexanecarboxylate phenyl ester, cyanophenylcyclohexane, a fluorine-substituted phenylcyclohexane, a cyano-substituted phenylpyrimidine, a fluorine-substituted phenylpyrimidine, an alkoxy-substituted phenylpyrimidine, a fluorine-substituted, alkoxy-substituted phenylpyrimidine, phenyldioxane, a tolan compound, a fluorine-substituted tolan compound, and alkenylcyclohexyl benzonitrile. Also there can be employed liquid crystal compounds described in *Liquid Crystal Device Handbook*, Japan Society for the Promotion of Science, Committee 142, p. 154-192 and 715-722 (1989), Published by Nikkan Kogyo Shimbun). There can also be employed a fluorine-substituted host liquid crystal suitable for a TFT drive, such as liquid crystals manufactured by E. Merck Inc. (such as ZLI-4692, MLC-6267, 6284, 6287, 6288, 6406, 6422, 6423, 6425, 6435, 6437, 7700, 7800, 9000, 9100, 9200, 9300 or 10000) or liquid crystals manufactured by Chisso Co. (such as LIXON 5036xx, 5037xx, 5039xx, 5040xx or 5041xx).

In the liquid crystal composition of the first embodiment of the present invention, there may be added a compound not showing a liquid crystalline property for the purpose of changing physical properties of the host liquid crystal (such as a temperature range of the liquid crystal phase, a dielectric anisotropy, a refractive index anisotropy or a cross-over frequency). The cross-over frequency means, in the dual-frequency switchable liquid crystal, a frequency at which the dielectric anisotropy changes from positive to negative.

The liquid crystal composition of the first embodiment of the present invention may further contain another compound such as an ultraviolet absorber or an antioxidant. Also the liquid crystal composition of the first embodiment of the present invention may include a chiral agent. A chiral agent means an optically active substance of which addition to a host liquid crystal causes the liquid crystal composition to exhibit a chiral nematic phase. Examples of such chiral agent include those for TN or STN mode, described in *Liquid Crystal Device Handbook*, Japan Society for the Promotion of Science, Committee 142, p. 199-202 (1989), Published by Nikkan Kogyo Shimbun).

Contents of the nematic liquid crystal and the chiral agent are not particularly limited to, but are preferably so determined, in case of producing a liquid crystal cell of a cell gap "d" with the composition of the first embodiment, that the liquid crystal has a helical pitch "P" satisfying a relation $0.1 \leq d/P \leq 20$, more preferably $0.25 \leq d/P \leq 5$, particularly preferably $0.4 \leq d/P \leq 2$, and most preferably $0.5 \leq d/P \leq 1$.

The helical pitch is defined by a distance in which the spiral structure of the liquid crystal molecules achieves a turn by 360°.

In the liquid crystal composition of the first embodiment of the invention, a ratio of the dichroic dye to the host liquid crystal may be selected arbitrarily, but is preferably 0.1 to 15 wt % and particularly preferably 0.5 to 6 wt %. Also a dye concentration, required for obtaining a desired optical density, is preferably determined by producing a liquid crystal cell with the liquid crystal composition of the first embodiment of the invention and by measuring an absorption spectrum of such liquid crystal cell. The liquid crystal composition of the first embodiment can be prepared by dissolving a dichroic dye and other additive compounds, to be added if necessary, in a host liquid crystal. The dissolving of the dichroic dye into the host liquid crystal can be achieved by a mechanical agitation, a heating, an ultrasonic wave application or a combination thereof.

SECOND EMBODIMENT

A liquid crystal composition of a second embodiment of the invention comprises a dichroic dye having a substituent represented by the aforementioned formula (1), and a liquid crystal comprising a nematic liquid crystal and a chiral agent. The dichroic dye to be employed in the second embodiment is same as that employed in the first embodiment, and the preferred scope is same as that of the first embodiment.

In the following, there will be explained a host liquid crystal to be employed in the liquid crystal composition of the second embodiment. The host liquid crystal employable in the liquid crystal composition of the second embodiment is preferably a compound capable of changing in an alignment state when being applied with an electric field, thereby controlling an alignment state of a dichroic dye dissolved as a guest.

The aforementioned host liquid crystal comprises at least a liquid crystal compound exhibiting a nematic phase, and preferably has an absolute value of a refractive index anisotropy ($\Delta n$) of 0.25 or less, more preferably $|\Delta n| \leq 0.15$, particularly preferably $|\Delta n| \leq 0.10$ and much more preferably $|\Delta n| \leq 0.05$.

Specific examples of the nematic liquid crystal compound include an azomethine compound, a cyanobiphenyl compound, a cyanophenyl ester, a fluorine-substituted phenyl ester, a cyclohexanecarboxylate phenyl ester, a fluorine-substituted cyclohexanecarboxylate phenyl ester, cyanophenylcyclohexane, a fluorine-substituted phenylcyclohexane, a cyano-substituted phenylpyrimidine, a fluorine-substituted phenylpyrimidine, an alkoxy-substituted phenylpyrimidine, a fluorine-substituted alkoxy-substituted phenylpyrimidine, phenyldioxane, a tolan compound, a fluorine-substituted tolan compound, and alkenylcyclohexyl benzonitrile. Also there can be employed liquid crystal compounds described in *Liquid Crystal Device Handbook*, Japan Society for the Promotion of Science, Committee 142, p. 154-192 and 715-722 (1989), Published by Nikkan Kogyo Shimbun). There can also be employed a fluorine-substituted host liquid crystal suitable for a TFT drive, such as liquid crystals manufactured by E. Merck Inc. (such as ZLI-4692, MLC-6267, 6284, 6287, 6288, 6406, 6422, 6423, 6425, 6435, 6437, 7700, 7800, 9000, 9100, 9200, 9300 or 10000) or liquid crystals manufactured by Chisso Co. (such as LIXON 5036xx, 5037xx, 5039xx, 5040xx or 5041xx).

In the liquid crystal composition of the second embodiment of the present invention, there may be added a compound not showing a liquid crystalline property for the purpose of changing physical properties of the host liquid crystal to a desired range (for example, for the purpose of changing a temperature range of the liquid crystal phase to a desired range). The liquid crystal composition of the second embodiment may further contain another compound such as an ultraviolet absorber or an antioxidant.

The liquid crystal employable in the second embodiment comprises at least one chiral agent. The chiral agent is an optically active substance of which addition to a host liquid crystal material causes the liquid crystal composition to exhibit a chiral nematic phase. Examples of such chiral agent include those for TN or STN mode, described in *Liquid Crystal Device Handbook*, Japan Society for the Promotion of Science, Committee 142, p. 199-202 (1989), Published by Nikkan Kogyo Shimbun).

Contents of the host liquid crystal and the dichroic dyes in the liquid crystal composition of the second embodiment are not particularly limited to, but a content of the dichroic dye (a total content of the dichroic dyes in case of a mixture) is preferably 0.1 to 15 wt % with respect to the content of the host liquid crystal, particularly preferably 0.5 to 6 wt %. Also a dye concentration, required for obtaining a desired optical density, is preferably determined by measuring an absorption spectrum of a liquid crystal cell.

In the liquid crystal composition of the second embodiment, contents of the nematic liquid crystal and the chiral agent are not particularly limited to, but are preferably determined in such a manner that a cell gap "d" of a liquid crystal cell employed in the liquid crystal device of the invention and a helical pitch "P" of the liquid crystal satisfy a relation $0.1 \leq d/P \leq 20$, more preferably $0.25 \leq d/P \leq 5$, particularly preferably $0.4 \leq d/P \leq 2$, and most preferably $0.5 \leq d/P \leq 1$.

The helical pitch is defined by a distance in which the spiral structure of the liquid crystal molecule achieves a turn by 360°.

The dissolving of the dichroic dye into the host liquid crystal can be achieved by a mechanical agitation, a heating, an ultrasonic wave application or a combination thereof.

(Liquid Crystal Device)

The present invention also relates to a liquid crystal device utilizing a liquid crystal composition of the aforementioned first or second embodiment. The liquid crystal device of the invention may be a liquid crystal device provided with a liquid crystal layer comprising the first or second liquid crystal composition of the invention. The liquid crystal device of the invention can be constituted of a pair of electrode substrates (at least one being preferably a transparent electrode substrate), and a liquid crystal layer containing a liquid crystal composition of the first or second embodiment of the invention, sandwiched between the pair of the electrode substrates. The substrate is usually constituted of a glass or plastic substrate, and a plastic substrate can be formed by an acrylic resin, a polycarbonate resin, or an epoxy resin. The substrate is described for example in *Liquid Crystal Device Handbook*, Japan Society for the Promotion of Science, Committee 142, p. 218-231 (1989), Published by Nikkan Kogyo Shimbun). On the substrate, there is formed an electrode layer, which is preferably an transparent electrode. The electrode layer can be constituted for example indium oxide, indium tin oxide (ITO), or tin oxide. The transparent electrode can for example be those described in *Liquid Crystal Device Handbook*, Japan Society for the Promotion of Science, Committee 142, p. 232-239 (1989), Published by Nikkan Kogyo Shimbun).

The liquid crystal device of the invention is preferably provided with a layer, subjected to an alignment process for the purpose of aligning the liquid crystal, on a surface of the substrate in contact with the liquid crystal. Such alignment process may be carried out by coating and aligning a quaternary ammonium salt, by coating polyimide and rubbing a surface of the polyimide layer, by an oblique evaporation of $SiO_2$, or by a light irradiation utilizing photoisomerization. An alignment film can for example be those described in *Liquid Crystal Device Handbook*, Japan Society for the Promotion of Science, Committee 142, p. 240-256 (1989), Published by Nikkan Kogyo Shimbun).

The liquid crystal device of the invention can be produced by forming a gap of 1 to 50 μm between the substrates for example by means of a spacer, and filling the gap with the liquid crystal composition of the invention. The employable spacer is described for example in *Liquid Crystal Device Handbook*, Japan Society for the Promotion of Science, Committee 142, p. 257-262 (1989), Published by Nikkan Kogyo Shimbun). The liquid crystal composition of the invention can be provided in a space between the substrates, by coating or printing on the substrate.

The liquid crystal device of the invention can be driven by a simple matrix drive method, or by an active matrix drive method utilizing for example a thin film transistor (TFT). Such drive methods are described in detail for example in *Liquid Crystal Device Handbook*, Japan Society for the Promotion of Science, Committee 142, p. 387-460 (1989), Published by Nikkan Kogyo Shimbun), and can be utilized for driving the liquid crystal device of the invention.

In case the liquid crystal device of the invention utilizes a liquid crystal composition of the first embodiment, voltages of a low frequency region and a high frequency region may be employed for driving such device. A frequency range of the voltage to be applied to the liquid crystal layer is variable depending on a type of the liquid crystal to be employed, and a cross-over frequency of such liquid crystal, but, in general, is preferably within a range of 0.1 Hz to 10 MHz, and more preferably 1 Hz to 1 MHz. A frequency in the low frequency region is preferably 0.1 Hz to 100 kHz, more preferably 1 Hz to 10 kHz and further preferably 10 Hz to 10 kHz. Also a frequency in the high frequency region is preferably 100 Hz to 10 MHz, more preferably 100 Hz to 1 MHz and further preferably 1 kHz to 1 MHz.

The liquid crystal display utilizing the liquid crystal device of the invention may be of any type, such as (1) a homogeneous alignment, (2) a homeotropic alignment, or a White-Taylor (phase shift) type utilizing (3) a focal conic alignment or (4) a homeotropic alignment, (5) a combination with super twisted nematic (STN) or (6) a combination with ferroelectric liquid crystal (FLC) as described in *Liquid Crystal Device Handbook*, Japan Society for the Promotion of Science, Committee 142, p. 309 (1989), Published by Nikkan Kogyo Shimbun); or (1) a Heilmeier GH mode, (2) a ¼ wavelength plate type GH mode, (3) a two-layered GH mode, (4) a phase shift GH mode or (5) a polymer dispersed liquid crystal (PDLC) GH mode as described in Tatsuo Uchida, *Reflective Color LCD Technology*, CMC, 1999, chap. 2-1 (GH mode reflective color LCD), p. 15-16.

The liquid crystal device of the invention is also applicable to a laminated GH mode described for example in JPA Nos. 10-67990, 10-239702, 10-133223, 10-339881, 11-52411, 11-64880 and 2000-221538 (the term "JPA" as used herein means an "unexamined published Japanese patent application (Kohkai Tokkyo Kohou)"). The liquid crystal device of the invention is also applicable to a GH mode utilizing microcapsules as described in JPA No. 11-24090. Thus, an embodiment of the liquid crystal device of the invention is a GH mode liquid crystal device having a liquid crystal layer between a pair of electrodes of which at least either is a transparent electrode, wherein the liquid crystal layer includes microcapsules containing the liquid crystal composition of the invention. Furthermore, liquid crystal device of the invention is applicable to a GH mode of polymer dispersed liquid crystal type, as described in JPA Nos. 5-61025, 5-265053, 6-3691, 6-23061, 5-203940, 6-242423, 6-289376, 8-278490 and 9-813174. Thus, an embodiment of the liquid crystal device of the invention is a GH mode liquid crystal device of polymer dispersed liquid crystal type, having a polymer medium layer between a pair of electrodes of which at least either is a transparent electrode, wherein the polymer medium layer includes a polymer, and a liquid crystal composition of the invention dispersed in the polymer.

Furthermore, the liquid crystal device of the invention can be employed in a reflective liquid crystal display described for example in JPA Nos. 6-235931, 6-235940, 6-265859, 7-56174, 9-146124, 9-197388, 10-20346, 10-31207, 10-31216, 10-31231, 10-31232, 10-31233, 10-31234, 10-82986, 10-90674, 10-111513, 10-111523, 10-123509, 10-123510, 10-206851, 10-253993, 10-268300, 11-149252, and 2000-2874.

The liquid crystal device of the invention may utilize a liquid crystal composition containing plural dichroic dyes. Also the liquid crystal composition may have any color. Also in case of forming a black-colored liquid crystal composition for example by mixing plural dichroic dyes, it can be utilized in a liquid crystal device for displaying white and black colors by a voltage application. It is also possible to prepare a liquid crystal device for color display by preparing liquid crystal compositions colored in red, green and blue and arranging such three compositions in parallel manner on a substrate. Also the liquid crystal device of the invention may have a laminate structure. For example there can be employed a three-layered structure respectively formed by yellow-, magenta- and cyan-colored liquid crystal compositions; a two-layered structure constituted of a layer formed by a parallel arrangement of yellow, magenta and cyan colored liquid crystal compositions and a layer formed by a parallel arrangement of liquid crystal compositions of complementary colors of blue, green and red; and a two-layered structure constituted of a layer of a black-colored liquid crystal composition and a layer formed by a parallel arrangement of liquid crystal compositions of blue, green and red.

EXAMPLES

The following examples further illustrate the present invention. The materials, reagents, amounts and proportions thereof, procedures or the like shown in the following examples can be appropriately changed without departing from the spirit of the present invention. Therefore, the scope of the present invention is not limited to the specific examples shown below.

Example 1-1

<Synthesis of Dichroic Dye>

Dichroic dyes (1-1), (1-2), (1-7) and (1-8) were synthesized according to a method described in JPA No. 2003-192664. A dichroic dye (1-12) was synthesized according to a method described in the specification of Japanese Patent Application 2004-89769. A dichroic dye (1-13) was synthesized according to a method described in the specification of Japanese Patent Application No. 2003-380669. A dichroic dye (1-14) was synthesized according to a method described in the specification of Japanese Patent Application No. 2004-50265. Dichroic dyes (Y-1), (M-1) and (C-1) were synthesized according to a method described in Jpn. J. Appl. Phys., vol. 37, p.3422 (1998).

Dichroic Dye Described in Jpn. J. Appl. Phys., Vol. 37, 3422 (1998)

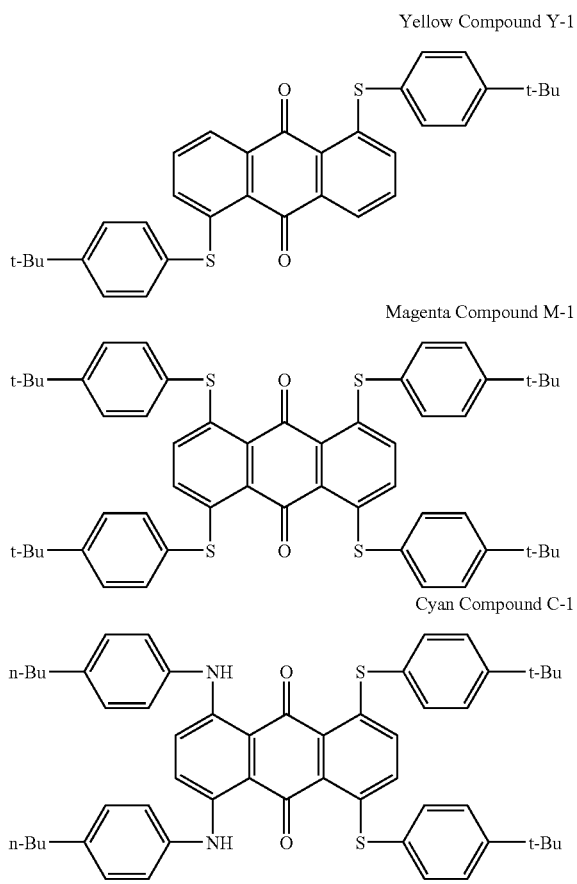

<Preparation of Liquid Crystal Composition>

A mixture of 5 mg of the dichroic dye (1-1) and 100 mg of a dual-frequency switchable nematic liquid crystal (H-1) described in Applied Physics Letters, Vol. 25, 186-188 (1974) as the host liquid crystal was heated for 1 hour on a hot plate of 150° C. The liquid crystal composition was cooled to the room temperature and was let to stand overnight.

Host Liquid Crystal (H-1)

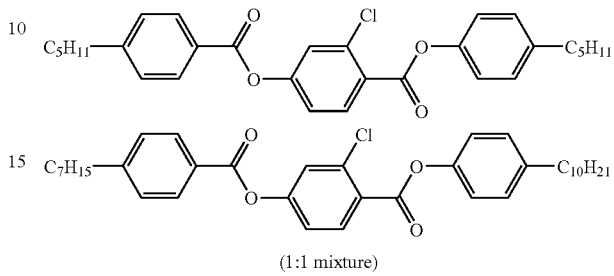

(1:1 mixture)

Liquid crystal compositions were prepared in the same manner as described above, except for employing a dichroic dye (1-8), (1-12), (1-13), (Y-1), (M-1) or (C-1) as shown in Table 1-1. Also a liquid crystal composition was prepared with the dichroic dye (1-14) in the same manner as described above except that 1 mg of the dichroic dye was mixed with 100 mg of the host liquid crystal.

<Preparation of Liquid Crystal Device>

A liquid crystal device was produced by pouring each of the liquid crystal compositions in a commercially available liquid crystal cell. The liquid crystal cell employed was a glass substrate (thickness of 0.7 mm) manufactured by E.H.C. and having an ITO transparent electrode layer, and had a cell gap of 8 μm and an epoxy resin seal. Also on mutually opposed surfaces of the paired glass substrates, there were formed polyimide homogeneous alignment films with rubbing for achieving a parallel alignment of the sealed liquid crystal.

<Evaluation of Order Parameter>

Each produced liquid crystal device was irradiated with a polarized light parallel or perpendicular to the rubbing direction, and an absorption spectrum (A∥ or A⊥) was measured with an ultraviolet-visible spectrophotometer (UV2400PC, manufactured by Shimadzu Corp.). An order parameter "S" was determined according to a following Equation (1) from A∥ and A⊥ at the wavelength of absorption peak:

$$S = (A_\parallel - A_\perp)/(A_\parallel + 2 \cdot A_\perp) \qquad \text{Equation (1)}$$

Results of measurement are shown in Table 1-1. Absorbance indicates the absorption A∥ when irradiated with a polarized light parallel to the rubbing direction.

TABLE 1-1

| dichroic dye | absorbance | order parameter | remark |
|---|---|---|---|
| 1-1 | 1.48 | 0.83 | invention |
| 1-8 | 1.59 | 0.82 | invention |
| 1-12 | 1.64 | 0.81 | invention |
| 1-13 | 1.34 | 0.78 | invention |
| 1-14 | 2.12 | 0.82 | invention |
| Y-1 | 0.35 | 0.60 | comp. ex. |
| M-1 | 0.28 | 0.74 | comp. ex. |
| C-1 | 0.79 | 0.53 | comp. ex. |

From the results in shown in Table 1-1, it is understandable that the liquid crystal device of the invention, utilizing a dichroic dye having a substituent represented by the formula (1) and a dual-frequency switchable nematic liquid crystal as a host liquid crystal, provided a higher absorbance and a higher order parameter, in comparison with Comparative Examples utilizing dichroic dyes not having such substituent.

Example 1-2

<Preparation of Liquid Crystal Cell>

On a glass substrate having an evaporated ITO film, a homogeneous alignment film SE-130, manufactured by Nissan Chemical Co., was coated and baked at 170° C. Such substrates, after being subjected to a rubbing process (for parallel alignment) were assembled with a spacer (8 μm) manufactured by Catalyst and Chemicals Ind. Co. and with an epoxy adhesive to obtain a sandwich-shaped liquid crystal cell.

<Preparation of Liquid Crystal Device>

5 mg of a dichroic dye (1-1) were mixed with 100 mg of a dual-frequency switchable nematic liquid crystal DF-05XX manufactured by Chisso Co., and were heated at 130° C. The mixture was cooled to the room temperature and poured into the aforementioned cell to obtain a liquid crystal device.

Liquid crystal devices were produced in the same manner as described above, respectively employing dichroic dyes (1-8), (Y-1), (M-1) and (C-1) as shown in Table 1-2. Also for a dichroic dye (1-14), a liquid crystal device was produced in the same manner as described above, except that 1 mg of the dye was mixed with 100 mg of the host liquid crystal.

<Absorption Spectrum Measurement under Voltage Application>

Each produced liquid crystal device was irradiated with a polarized light parallel to the rubbing direction, and an absorption spectrum (A∥(0V)) was measured with a visible spectrophotometer (UV2400, manufactured by Shimadzu Corp.). Then a rectangular AC voltage (20V, 100 Hz) was applied to each liquid crystal device, which was irradiated with a polarized light parallel to the rubbing direction, and an absorption spectrum (A∥(20V)) was measured. From the measured values of (A∥(0V)) and (A∥(20V)) at the wavelength of absorption peak, Dmax/Dmin was determined according to the following equation. Results of measurement are shown in Table 1-2.

$D\max/D\min=\{A\|(0V)\}/\{A\|(20V)\}$

TABLE 1-2

| dichroic dye | Dmax/Dmin | Remarks |
| --- | --- | --- |
| 1-1 | 15.4 | invention |
| 1-8 | 14.2 | invention |
| 1-14 | 14.7 | invention |
| Y-1 | 5.7 | comp. example |
| M-1 | 9.2 | comp. example |
| C-1 | 4.3 | comp. example |

From the results in shown in Table 1-2, it is understandable that the liquid crystal device of the invention, utilizing a liquid crystal composition comprising a dichroic dye having a substituent represented by the formula (1) and a dual-frequency switchable nematic liquid crystal, provided a higher concentration ratio Dmax/Dmin, in comparison with the liquid crystal device produced with a liquid crystal composition comprising dichroic dyes not having such substituent.

Example 1-3

<Preparation of Liquid Crystal Composition>

A mixture of 2.5 mg of the example compound (1-1) and 2.5 mg of the example compound (1-2) as dichroic dyes, 100 mg of a dual-frequency switchable nematic liquid crystal (H-1) as the host liquid crystal, and 1.1 mg of a chiral agent R-811 manufactured by E. Merck Inc. was heated for 1 hour on a hot plate of 150° C. to obtain a liquid crystal composition. The liquid crystal composition was cooled to the room temperature and was let to stand overnight.

Also liquid crystal compositions were prepared in the same manner as described above, except that types and amounts of the dichroic dyes were changed from the dichroic dyes (1-1) and (1-2). The used dichroic dyes are shown in Table 1-3. An amount of the dichroic dye was, in a case utilizing (1-7) and (1-8), 2.5 mg of (1-7) and 2.5 mg of (1-8); also 1.0 mg in a case utilizing (1-14); 5 mg in a case utilizing (Y-1); 5 mg in a case utilizing (M-1); and 5 mg in case utilizing (C-1).

<Preparation of Liquid Crystal Device>

A liquid crystal device was produced by pouring each of the liquid crystal compositions in a commercially available homogeneous-alignment liquid crystal cell. The liquid crystal cell employed a glass substrate (thickness of 0.7 mm) manufactured by E.H.C. and having an ITO transparent electrode layer, and had a cell gap of 8 μm and an epoxy resin seal. Also on mutually opposed surfaces of the paired glass substrates, there were formed unrubbed polyimide alignment films.

<Evaluation of Reflectance and Contrast>

On an image display side of thus produced liquid crystal device, transmittances in a white state (transparent state) and in a color state (colored state) and a contrast ratio (white transmittance/color transmittance) were measured with a spectrophotometer (UV2400PC, manufactured by Shimadzu Corp.). A voltage of 100 Hz, 20V was applied at the white state (transparent state). Results of measurement are shown in Table 1-3.

TABLE 1-3

| Dichroic dye | contrast ratio | Remarks |
| --- | --- | --- |
| (1-1) + (1-2) | 8.3 | invention |
| (1-7) + (1-8) | 9.1 | invention |
| 1-14 | 7.5 | invention |
| Y-1 | 1.3 | comp. example |
| M-1 | 1.3 | comp. example |
| C-1 | 1.8 | comp. example |

From the results in shown in Table 1-3, it is understandable that the liquid crystal device of the invention, utilizing a liquid crystal composition comprising a dichroic dye having a substituent represented by the formula (1) and a dual-frequency switchable nematic liquid crystal, provided a higher contrast ratio, in comparison with the liquid crystal device produced with a liquid crystal composition comprising dichroic dyes not having such substituent.

Through Examples 1-1 to 1-3, it was verified that the dichroic dye having the substituent represented by the formula (1) gave a high order parameter in the dual-frequency switchable nematic liquid crystal and had a high solubility, whereby the liquid crystal device employing the composition of the invention exhibited a large Dmax in the absence of voltage application and a small Dmin under the voltage application.

It was also verified that the liquid crystal device of the invention, when placed on a scattering white board, showed a white color based on a light scattering, under a voltage application. It was thus verified that the liquid crystal device provided a scattering white background similar to that of a paper, and exhibited an excellent visibility without any polarizing plate.

Example 1-4

<Preparation of Liquid Crystal Composition>

A mixture of 1.0 mg of a dichroic dye (1-14), 100 mg of a dual-frequency switchable nematic liquid crystal (H-1) as the host liquid crystal, and 1.1 mg of a chiral agent R-811 manufactured by E. Merck Inc. was heated for 1 hour on a hot plate of 150° C. to obtain a liquid crystal composition. The liquid crystal composition was cooled to the room temperature and was let to stand overnight.

<Preparation of Liquid Crystal Device>

A liquid crystal device was produced by pouring the liquid crystal composition in a commercially available liquid crystal cell. The liquid crystal cell employed was a glass substrate (thickness of 0.7 mm) manufactured by E.H.C. and having an ITO transparent electrode layer, and had a cell gap of 8 μm and an epoxy resin seal. An alignment film was not provided on the ITO transparent electrode.

<Measurement of Transmittance under Frequency Modulation>

A low-frequency rectangular AC voltage (20V, 100 Hz) was applied to thus produced liquid crystal device, and a transmittance was measured with a spectrophotometer (UV2400PC, manufactured by Shimadzu Corp.). Then a transmittance was measured under an application of a high-frequency rectangular AC voltage (20V, 5 kHz). A ratio of high-frequency transmittance/low-frequency transmittance was 7.5, same as the contrast ratio measured in Example 1-3. From the result, it was verified that the liquid crystal could be switched by a frequency of the applied voltage only. It was also verified that the liquid crystal device of the invention did not require an alignment film.

Example 1-5

<Preparation of Liquid Crystal Device>

A liquid crystal device was produced by pouring the liquid crystal composition, produced in Example 1-4, in a liquid crystal cell manufactured by Nippo Denki Co. The liquid crystal cell employed was a glass substrate (thickness of 1.1 mm) having an ITO transparent electrode layer, and had a cell gap of 8 μm and an epoxy resin seal. Also on mutually opposed surfaces of the paired glass substrates, there were formed polyimide alignment films JALS-2021 (vertical alignment), manufactured by JSR Corp.

<Measurement of Response Speed>

The aforementioned liquid crystal device was subjected to repeated alternate applications of a high-frequency rectangular AC voltage (20V, 10 kHz) and a low-frequency rectangular AC voltage (20V, 100 Hz), and a change in the transmittance was measured with an LCD evaluation apparatus (LCD-5200, manufactured by Otsuka Denshi Co.). A time required by the change in transmittance to reach 80% of the difference in transmittance before and after the frequency switching was taken as a response speed. Results are shown in Table 1-4.

In Table 1-4, "H→PL" indicates a time required for a change from a homeotropic alignment to a planar alignment, and "PL→H" indicates a time required for a change from a planar alignment to a homeotropic alignment.

TABLE 1-4

| host liquid crystal | H → PL | PL → H | Remarks |
| --- | --- | --- | --- |
| H-1 | 5 msec | 15 msec | invention |

From the results in shown in Table 1-4, it is understandable that the liquid crystal device of the invention has a high response speed. From this result, it was verified that the liquid crystal device of the invention, being actively switched off by the dual-frequency drive, provided a higher response speed.

Example 1-6

<Preparation of Liquid Crystal Composition>

A mixture of 2.0 mg of a dichroic dye (1-8), 90 mg of a dual-frequency switchable nematic liquid crystal (H-1) as the host liquid crystal, 10 mg of a following liquid crystalline compound (A-1) having a negative Δs, and 1.1 mg of a chiral agent R-811 manufactured by E. Merck Inc. was heated for 1 hour on a hot plate of 150° C. The liquid crystal composition was cooled to the room temperature and was let to stand overnight.

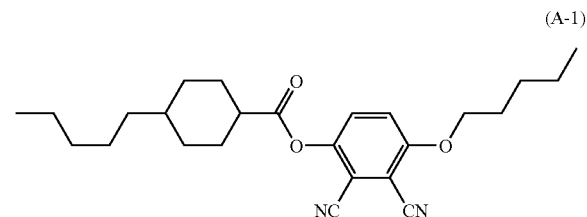

(A-1)

<Preparation of Liquid Crystal Device>

A liquid crystal device 1 was produced by pouring thus produced liquid crystal composition in a commercially available homogeneous-alignment liquid crystal cell. The liquid crystal cell employed was a glass substrate (thickness of 0.7 mm) manufactured by E.H.C. and having an ITO transparent electrode layer, and had a cell gap of 8 μm and an epoxy resin seal. Also on mutually opposed surfaces of the paired glass substrates, there were formed polyimide alignment films.

A liquid crystal device 2 was produced by pouring the aforementioned liquid crystal composition in a liquid crystal cell manufactured by Nippo Denki Co. The liquid crystal cell employed was a glass substrate (thickness of 1.1 mm) having an ITO transparent electrode layer, and had a cell gap of 8 μm and an epoxy resin seal. Also on mutually opposed surfaces of the paired glass substrates, there were formed polyimide alignment films JALS-2021 (vertical alignment film), manufactured by JSR Corp.

<Measurement of Dielectric Constant—Frequency Characteristics>

The produced liquid crystal devices 1 and 2 were subjected to a measurement of dielectric constant-frequency characteristics with an impedance analyzer (Solatron 1260, manufactured by Toyo Technica Co.). A calculation of frequency characteristics of a dielectric anisotropy (Δε), based on the measure dielectric constants ε1 and ε2, provided a crossover frequency of about 1 kHz at 25° C. This result indicates that the liquid crystal device of the invention has a very low crossover frequency.

The crossover frequency means a frequency at the dielectric anisotropy Δε changes from positive to negative, when the frequency of the applied voltage is increased.

Example 2-1

<Synthesis of Dichroic Dye>

Dichroic dyes (1-1), (1-2), (1-7) and (1-8) were synthesized according to a method described in JPA No. 2003-192664. A dichroic dye (1-12) was synthesized according to a method described in the specification of Japanese Patent Application No. 2004-89769. A dichroic dye (1-13) was synthesized according to a method described in the specification of Japanese Patent Application No. 2003-380669. A dichroic dye (1-14) was synthesized according to a method described in the specification of Japanese Patent Application No. 2004-50265. Dichroic dyes (Y-1), (M-1) and (C-1) were synthesized according to a method described in Jpn. J. Appl. Phys., vol. 37, p.3422 (1998).

Dichroic Dye Described in Jpn. J. Appl. Phys., Vol. 37, 3422 (198)

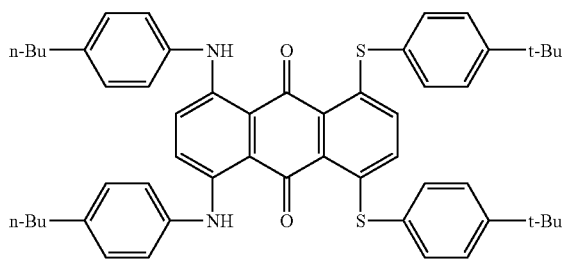

<Preparation of Liquid Crystal Composition 1>

A mixture of 5 mg of the dichroic dye (1-1) and 100 mg of ZLI-2806 manufactured by E. Merck Inc. as the host liquid crystal was heated for 1 hour on a hot plate of 150° C. to obtain a liquid crystal composition. The liquid crystal composition was cooled to the room temperature and was let to stand overnight.

Liquid crystal compositions were prepared in the same manner as described above, employing a dichroic dye (1-8), (1-12), (1-13), (Y-1), (M-1) or (C-1) as shown in Table 2-1. Also a liquid crystal composition was prepared with the dichroic dye (1-14) in the same manner as described above except that 1 mg of the dichroic dye was mixed with 100 mg of the host liquid crystal.

<Preparation of Liquid Crystal Device>

A liquid crystal device was produced by pouring each of the liquid crystal compositions in a commercially available liquid crystal cell. The liquid crystal cell employed was a glass substrate (thickness of 0.7 mm) manufactured by E.H.C. and having an ITO transparent electrode layer, and had a cell gap of 8 μm and an epoxy resin seal. Also on mutually opposed surfaces of the paired glass substrates, there were formed polyimide homogeneous alignment films with rubbing for achieving a parallel alignment of the sealed liquid crystal.

<Evaluation of Order Parameter>

Each produced liquid crystal device was irradiated with a polarized light parallel or perpendicular to the rubbing direction, and an absorption spectrum (A∥ or A⊥) was measured with an ultraviolet-visible spectrophotometer (UV2400PC, manufactured by Shimadzu Corp.). An order parameter "S" was determined according to a following Equation 1 from A∥ and A⊥ at the wavelength of absorption peak:

$$S = (A_\parallel - A_\perp)/(A_\parallel + 2A_\perp) \quad \text{Equation 1}$$

Results of measurement are shown in Table 2-1. Absorbance indicates the absorption A∥ when irradiated with a polarized light parallel to the rubbing direction.

TABLE 2-1

| dichroic dye | absorbance | order parameter | Remarks |
|---|---|---|---|
| 1-1 | 1.31 | 0.84 | invention |
| 1-8 | 1.36 | 0.83 | invention |
| 1-12 | 1.39 | 0.82 | invention |
| 1-13 | 1.21 | 0.79 | invention |
| 1-14 | 1.48 | 0.84 | invention |
| 1-16 | 1.18 | 0.80 | invention |
| Y-1 | 0.37 | 0.73 | comp. ex. |

TABLE 2-1-continued

| dichroic dye | absorbance | order parameter | Remarks |
|---|---|---|---|
| M-1 | 0.23 | 0.74 | comp. ex. |
| C-1 | 0.67 | 0.54 | comp. ex. |

From the results in shown in Table 2-1, it is understandable that the liquid crystal composition comprising a dichroic dye having a substituent represented by the formula (1) and a nematic liquid crystal provided a higher absorbance and a higher order parameter, in comparison with the liquid crystal composition comprising dichroic dyes not having such substituent.

<Preparation of Liquid Crystal Composition 2>

A mixture of 2.5 mg of the example compound (1-1) and 2.5 mg of the example compound (1-2) as dichroic dyes, 100 mg of ZLI-2806 manufactured by E. Merck Inc. as the host liquid crystal, and 1.1 mg of a chiral agent R-811 manufactured by E. Merck Inc. was heated for 1 hour on a hot plate of 130° C. to obtain a liquid crystal composition. The liquid crystal composition was cooled to the room temperature and was let to stand overnight.

Also liquid crystal compositions were prepared in the same manner as described above, except that types and amounts of the dichroic dyes were changed from the dichroic dyes (1-1) and (1-2). The used dichroic dyes are shown in Table 2-2. An amount of the dichroic dye was 2.5 mg each in a case utilizing (1-7) and (1-8); also 5.0 mg in a case utilizing (1-12); 5.0 mg in a case utilizing (1-13); 1.0 mg in a case utilizing (1-14); 1.0 mg in a case utilizing (1-16); 5 mg in a case utilizing (Y-1); 5 mg in a case utilizing (M-1); and 5 mg in case utilizing (C-1).

<Preparation of Liquid Crystal Device>

A liquid crystal device was produced by pouring each of the liquid crystal compositions in a liquid crystal cell manufactured by Nippo Denki Co. The liquid crystal cell employed was a glass substrate (thickness of 1.1 mm) having an ITO transparent electrode layer, and had a cell gap of 8 µm and an epoxy resin seal. Also on mutually opposed surfaces of the paired glass substrates, there were formed polyimide alignment films JALS-2021 (vertical alignment), manufactured by JSR Corp.

<Evaluation of Contrast Ratio>

On an image display side of thus produced liquid crystal device, a contrast ratio (white transmittance/color transmittance) was measured with a spectrophotometer (UV2400PC, manufactured by Shimadzu Corp.). A voltage of 100 Hz, 20V was applied at the color display side (colored state). Results of measurement are shown in Table 2-2.

TABLE 2-2

| dichroic dye | contrast ratio | Remarks |
|---|---|---|
| (1-1) + (1-2) | 8.5 | Invention |
| (1-7) + (1-8) | 9.3 | Invention |
| 1-12 | 7.7 | Invention |
| 1-13 | 6.8 | Invention |
| 1-14 | 7.9 | Invention |
| 1-16 | 7.0 | Invention |
| Y-1 | 1.6 | comp. example |
| M-1 | 1.6 | comp. example |
| C-1 | 2.2 | comp. example |

From the results in shown in Table 2-2, it is understandable that the liquid crystal device of the invention, utilizing a liquid crystal composition comprising a dichroic dye having a substituent represented by the formula (1) and a liquid crystal, containing a nematic liquid crystal and a chiral agent, provided a significantly higher contrast ratio, in comparison with the liquid crystal devices produced with the liquid crystal composition comprising dichroic dyes not having such substituent.

Based on the foregoing, it was verified that, since the dichroic dye having a substituent represented by the formula (1) gave a high order parameter and had a high solubility in the nematic liquid crystal, the liquid crystal device produced with the composition of the invention exhibited a significantly higher Dmax in the absence of voltage application and a significantly lower Dmin under the voltage application, in comparison with the liquid crystal device produced with a dichroic dye not having such substituent.

It was also verified that the liquid crystal device of the invention, when placed on a scattering white board, showed a white color based on a light scattering, under a voltage application. It was thus verified that the liquid crystal device of the invention provided a scattering white background similar to that of a paper, and exhibited an excellent visibility without any polarizing plate.

Example 2-2

A liquid crystal composition was prepared in the same manner as in the foregoing preparation of the liquid crystal composition 2, except for employing ZLI-5081 (manufactured by E. Merck Inc.) as the host liquid crystal. A liquid crystal device was produced similarly by pouring the liquid crystal composition in a liquid crystal cell manufactured by Nippo Denki Co. The liquid crystal cell employed was a glass substrate (thickness of 1.1 mm) having an ITO transparent electrode layer, and had a cell gap of 8 µm and an epoxy resin seal. Also on mutually opposed surfaces of the paired glass substrates, there were formed alignment films SE-130 (homogeneous alignment film), manufactured by Nissan Chemical Co.

An evaluation as in Example 2-1 provided a high contrast ratio.

Example 2-3

A liquid crystal device was produced in the same manner as in Example 2-1, except for employing a mixture of 50 mg of ZLI-2806 (Δn=0.0437, manufactured by E. Merck Inc.) and 50 mg of a following low Δn compound (H-1) as the host liquid crystal, and subjected to a contrast ratio evaluation. As a result, a similarly high contrast ratio was obtained.

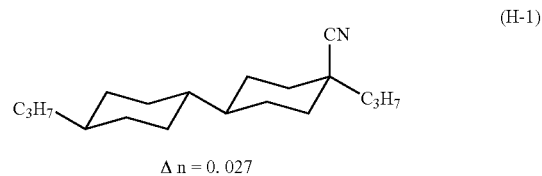

(H-1)

Δn = 0.027

Example 2-4

<Preparation of Liquid Crystal Composition>

A mixture of 1.0 mg of a dichroic dye (1-14), 100 mg of ZLI-2806 manufactured by E. Merck Inc. as the host liquid crystal, and 1.1 mg of a chiral agent R-811 manufactured by E. Merck Inc. was heated for 1 hour on a hot plate of 130° C. to obtain a liquid crystal composition. The liquid crystal composition was cooled to the room temperature and was let to stand overnight.

<Preparation of Liquid Crystal Device>

A liquid crystal device was produced by pouring the liquid crystal composition in a liquid crystal cell manufactured by Nippo Denki Co. The liquid crystal cell employed was a glass substrate (thickness of 1.1 mm) bearing an ITO transparent electrode layer, and had a cell gap of 8 μm and an epoxy resin seal. Also on mutually opposed surfaces of the paired glass substrates, there were formed polyimide alignment films JALS-2021 (vertical alignment film), manufactured by JSR Corp.

<Measurement of Response Speed>

The aforementioned liquid crystal device was subjected to an application of a rectangular AC voltage (20V, 100 Hz), and a change in the transmittance was measured with an LCD evaluation apparatus (LCD-5200, manufactured by Otsuka Denshi Co.). A time required by the change in transmittance to reach 20% of the transmittance under no voltage application was taken as a response speed. Results are shown in Table 2-3.

TABLE 2-3

| dichroic dye | response speed | remarks |
|---|---|---|
| 1-14 | 5 msec | invention |

From the results in shown in Table 2-2, it is understandable that the liquid crystal device of the invention, produced with a liquid crystal composition comprising a dichroic dye having a substituent represented by the formula (1), had a higher response speed, in comparison with the liquid crystal device, produced with a liquid crystal composition comprising a dichroic dye not having such substituent. This is presumably because the dichroic dye having the substituent represented by the formula (1) has a higher mutual solubility with the host liquid crystal, thus showing little viscosifying effect in the liquid crystal composition by a dye addition.

From these examples, it is understandable that the liquid crystal device, produced with the liquid crystal composition containing the dichroic dye having the substituent represented by the formula (1) of the invention, and a liquid crystal containing a nematic liquid crystal and a chiral agent, can provide a high contrast ratio and a high response speed.

INDUSTRIAL APPLICABILITY

The liquid crystal composition of the invention can be employed widely in the preparation of a liquid crystal device, particularly in the preparation of a guest-host type liquid crystal display device. A guest-host type liquid crystal display device produced with the liquid crystal composition of the invention provides a high contrast and a fast response speed, and is also excellent in visibility.

The invention claimed is:

1. A liquid crystal composition comprising at least a dichroic dye represented by a following formula (3), and a dual-frequency switchable nematic liquid crystal as a host liquid crystal:

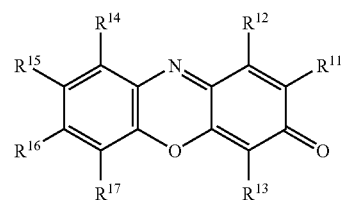

Formula (3)

where $R^{11}$, $R^{12}$, $R^{13}$, $R^{14}$, $R^{15}$, $R^{16}$, and $R^{17}$ respectively represent a hydrogen atom or a substituent, provided that at least one represents a substituent represented by —S—$\{(B^1)_p$-$(Q^1)_q$-$(B^2)_r\}_n$—$C^1$, in which S represents a sulfur atom; $B^1$ and $B^2$ respectively represent a substituted or non-substituted arylene group, heteroarylene group or divalent cyclic aliphatic hydrocarbon group; $Q^1$ represents a divalent linking group; $C^1$ represents a substituted or non-substituted alkyl group, cycloalkyl group, alkoxy group, alkoxycarbonyl group, acyl group or acyloxy group; p, q and r respectively represent an integer from 0 to 5; and n represents an integer from 1 to 3, provided that a total number of groups represented by $B^1$ and $B^2$ is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p$-$(Q^1)_q$-$(B^2)_r\}$ present in two or more units may be same or different to each other.

2. The liquid crystal composition of claim 1, further comprising at least one chiral agent.

3. The liquid crystal composition of claim 1, wherein $R^{14}$ is a substituent represented by —S—$\{(B^1)_p$-$(Q^1)_q$-$(B^2)_r\}_n$—$C^1$.

4. The liquid crystal composition of claim 1, wherein —$\{(B^1)_p$-$(Q^1)_q$-$(B^2)_r\}$—$C^1$ is a substituent represented by a formula (a-1) or a formula (a-2);

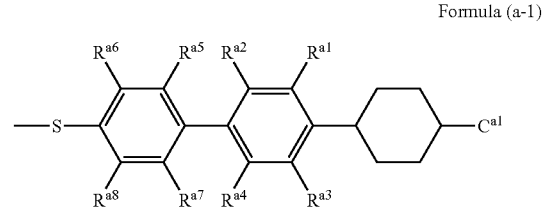

Formula (a-1)

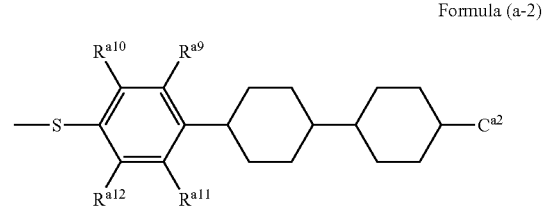

Formula (a-2)

wherein S is a sulfur atom, $R^{a1}$, $R^{a2}$, $R^{a3}$, $R^{a4}$, $R^{a5}$, $R^{a6}$, $R^{a7}$, $R^{a8}$, $R^{a9}$, $R^{a10}$, $R^{a11}$ and $R^{a12}$ respectively represent a hydrogen atom or a substituent; and $C^{a1}$ and $C^{a2}$ respectively represent a substituted or non-substituted alkyl group.

5. A liquid crystal composition comprising:
a dichroic dye represented by a following formula (3), and a liquid crystal comprising at least one nematic liquid crystal compound and at least one chiral agent:

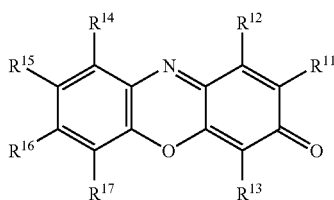

Formula (3)

where $R^{11}$, $R^{12}$, $R^{13}$, $R^{14}$, $R^{15}$, $R^{16}$, and $R^{17}$ respectively represent a hydrogen atom or a substituent, provided that at least one represents a substituent represented by —S—$\{(B^1)_p\text{-}(Q^1)_q\text{-}(B^2)_r\}_n$—$C^1$, in which S represents a sulfur atom; $B^1$ and $B^2$ respectively represent a substituted or non-substituted arylene group, heteroarylene group or divalent cyclic aliphatic hydrocarbon group; $Q^1$ represents a divalent linking group; $C^1$ represents a substituted or non-substituted alkyl group, cycloalkyl group, alkoxy group, alkoxycarbonyl group, acyl group or acyloxy group; p, q and r respectively represent an integer from 0 to 5; and n represents an integer from 1 to 3, provided that a total number of groups represented by $B^1$ and $B^2$ is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p\text{-}(Q^1)_q\text{-}(B^2)_r\}$ present in two or more units may be same or different to each other.

6. The liquid crystal composition of claim 5, wherein $R^{14}$ is a substituent represented by —S—$\{(B^1)_p\text{-}(Q^1)_q\text{-}(B^2)_r\}_n$—$C^1$.

7. The liquid crystal composition of claim 5, wherein —$\{(B^1)_p\text{-}(Q^1)_q\text{-}(B^2)_r\}$—$C^1$ is a substituent represented by a formula (a-1) or a formula (a-2);

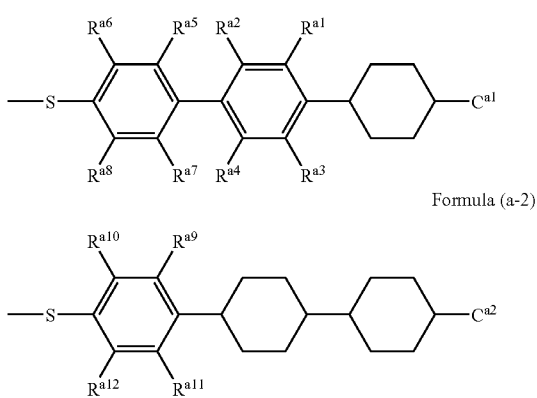

Formula (a-1)

Formula (a-2)

wherein S is a sulfur atom, $R^{a1}$, $R^{a2}$, $R^{a3}$, $R^{a4}$, $R^{a5}$, $R^{a6}$, $R^{a7}$, $R^{a8}$, $R^{a9}$, $R^{a10}$, $R^{a11}$ and $R^{a12}$ respectively represent a hydrogen atom or a substituent; and $C^{a1}$ and $C^{a2}$ respectively represent a substituted or non-substituted alkyl group.

8. A liquid crystal device comprising:
a pair of electrodes of which at least one is a transparent electrode, and
a layer between the pair of electrodes comprising a liquid crystal composition of claim 1.

9. The liquid crystal device of claim 8, wherein the layer comprises a polymer and the liquid crystal composition dispersed in the polymer.

10. The liquid crystal device of claim 8, wherein the layer comprises microcapsules respectively comprising the liquid crystal composition.

11. A liquid crystal device comprising:
a pair of electrodes of which at least one is a transparent electrode, and
a layer between the pair of electrodes comprising a liquid crystal composition of claim 5.

12. The liquid crystal device of claim 11, wherein the layer comprises a polymer and the liquid crystal composition dispersed in the polymer.

13. The liquid crystal device of claim 11, wherein the layer comprises microcapsules respectively comprising the liquid crystal composition.

14. A liquid crystal composition comprising at least a dichroic dye represented by a following formula (2), and a dual-frequency switchable nematic liquid crystal as a host liquid crystal:

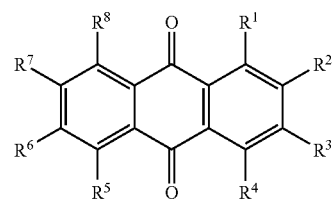

Formula (2)

where $R^1$ represents a substituent represented by —S—$\{(B^1)_p\text{-}(Q^1)_q\text{-}(B^2)_r\}_n$—$C^1$, in which S represents a sulfur atom; $B^1$ and $B^2$ respectively represent a substituted or non-substituted arylene group, heteroarylene group or divalent cyclic aliphatic hydrocarbon group; $Q^1$ represents a divalent linking group; $C^1$ represents a substituted or non-substituted alkyl group, cycloalkyl group, alkoxy group, alkoxycarbonyl group, acyl group or acyloxy group;

p, q and r respectively represent an integer from 0 to 5; and n represents an integer from 1 to 3, provided that a total number of groups represented by $B^1$ and $B^2$ is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p\text{-}(Q^1)_q\text{-}(B^2)_r\}$ present in two or more units may be same or different to each other; $R^2$, $R^3$, $R^4$, $R^5$, $R^6$, $R^7$ and $R^8$ respectively represent a hydrogen atom, a fluorine atom, a chlorine atom, a hydroxy, an optionally substituted hydrocarbon arylthio group, an optionally substituted alkylthio group, an optionally substituted amino group, an optionally substituted alkylamino group an optionally substituted arylamino group, an optionally substituted alkyl group, an optionally substituted aryl group, an optionally substituted alkoxy group or an optionally substituted aryloxy group.

15. The liquid crystal composition of claim 14, further comprising at least one chiral agent.

16. The liquid crystal composition of claim 14, wherein —$\{(B^1)_p\text{-}(Q^1)_q\text{-}(B^2)_r\}$—$C^1$ is a substituent represented by a formula (a-1) or a formula (a-2);

Formula (a-1)

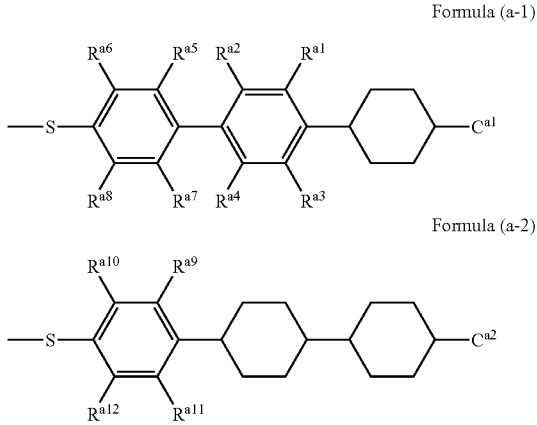

Formula (a-2)

wherein S is a sulfur atom, $R^{a1}$, $R^{a2}$, $R^{a3}$, $R^{a4}$, $R^{a5}$, $R^{a6}$, $R^{a7}$, $R^{a8}$, $R^{a9}$, $R^{a10}$, $R^{a11}$ and $R^{a12}$ respectively represent a hydrogen atom or a substituent; and $C^{a1}$ and $C^{a2}$ respectively represent a substituted or non-substituted alkyl group.

17. A liquid crystal device comprising:
a dichroic dye represented by a following formula (2), and
a liquid crystal comprising at least one nematic liquid crystal compound and at least one chiral agent:

Formula (2)

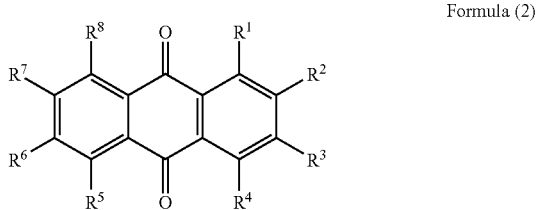

where $R^1$ represents a substituent represented by —S—{$(B^1)_p$-$(Q^1)_q$-$(B^2)_r$}$_n$—$C^1$, in which S represents a sulfur atom; $B^1$ and $B^2$ respectively represent a substituted or non-substituted arylene group, heteroarylene group or divalent cyclic aliphatic hydrocarbon group; $Q^1$ represents a divalent linking group; $C^1$ represents a substituted or non-substituted alkyl group, cycloalkyl group, alkoxy group, alkoxycarbonyl group, acyl group or acyloxy group;
p, q and r respectively represent an integer from 0 to 5; and n represents an integer from 1 to 3, provided that a total number of groups represented by $B^1$ and $B^2$ is from 3 to 10; in case any of p, q and r is equal to or larger than 2, $B^1$, $Q^1$ or $B^2$ present in two or more units may be same or different to each other; and, in case n is equal to or larger than 2, {$(B^1)_p$-$(Q^1)_q$-$(B^2)_r$} present in two or more units may be same or different to each other; $R^2$, $R^3$, $R^4$, $R^5$, $R^6$, $R^7$ and $R^8$ respectively represent a hydrogen atom, a fluorine atom, a chlorine atom, a hydroxy, an optionally substituted hydrocarbon arylthio group, an optionally substituted alkylthio group, an optionally substituted amino group, an optionally substituted alkylamino group, an optionally substituted arylamino group, an optionally substituted alkyl group, an optionally substituted aryl group, an optionally substituted alkoxy group or an optionally substituted aryloxy group.

18. The liquid crystal composition of claim 17, wherein —{$(B^1)_p$-$(Q^1)_q$-$(B^2)_r$}—$C^1$ is a substituent represented by a formula (a-1) or a formula (a-2);

Formula (a-1)

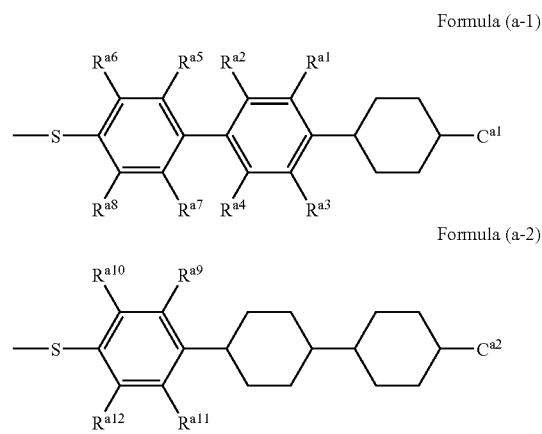

Formula (a-2)

wherein S is a sulfur atom, $R^{a1}$, $R^{a2}$, $R^{a3}$, $R^{a4}$, $R^{a5}$, $R^{a6}$, $R^{a7}$, $R^{a8}$, $R^{a9}$, $R^{a10}$, $R^{a11}$ and $R^{a12}$ respectively represent a hydrogen atom or a substituent; and $C^{a1}$ and $C^{a2}$ respectively represent a substituted or non-substituted alkyl group.

19. A liquid crystal device comprising:
a pair of electrodes of which at least one is a transparent electrode, and
a layer between the pair of electrodes comprising a liquid crystal composition of claim 14.

20. The liquid crystal device of claim 14, wherein the layer comprises a polymer and the liquid crystal composition dispersed in the polymer.

21. The liquid crystal device of claim 14, wherein the layer comprises microcapsules respectively comprising the liquid crystal composition.

22. A liquid crystal device comprising:
a pair of electrodes of which at least one is a transparent electrode, and
a layer between the pair of electrodes comprising a liquid crystal composition of claim 17.

23. The liquid crystal device of claim 22, wherein the layer comprises a polymer and the liquid crystal composition dispersed in the polymer.

24. The liquid crystal device of claim 22, wherein the layer comprises microcapsules respectively comprising the liquid crystal composition.

* * * * *